United States Patent
Aoki

(10) Patent No.: US 8,493,901 B2
(45) Date of Patent: Jul. 23, 2013

(54) WIRELESS COMMUNICATION SYSTEM, WIRELESS COMMUNICATION APPARATUS, AND METHOD OF CONTROL THEREOF

(75) Inventor: Norihito Aoki, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 811 days.

(21) Appl. No.: 12/667,030

(22) PCT Filed: Jul. 28, 2008

(86) PCT No.: PCT/JP2008/063920
§ 371 (c)(1),
(2), (4) Date: Dec. 28, 2009

(87) PCT Pub. No.: WO2009/022562
PCT Pub. Date: Feb. 19, 2009

(65) Prior Publication Data
US 2010/0329163 A1    Dec. 30, 2010

(30) Foreign Application Priority Data

Aug. 16, 2007    (JP) .................................. 2007-212334

(51) Int. Cl.
*G08C 17/00*    (2006.01)
(52) U.S. Cl.
USPC ............... 370/311; 370/310; 455/60; 455/61; 455/62; 455/63.3; 455/63.4
(58) Field of Classification Search
None
See application file for complete search history.

(56) References Cited

U.S. PATENT DOCUMENTS

| | | | |
|---|---|---|---|
| 6,509,865 | B2 | 1/2003 | Takai |
| 6,697,642 | B1* | 2/2004 | Thomas ..................... 455/562.1 |
| 7,515,874 | B2* | 4/2009 | Nikolajevic et al. ......... 455/41.2 |
| 2002/0083458 | A1 | 6/2002 | Henderson et al. |
| 2005/0129009 | A1 | 6/2005 | Kitchin |
| 2005/0141545 | A1* | 6/2005 | Fein et al. ..................... 370/445 |
| 2005/0215261 | A1* | 9/2005 | Cha et al. .................... 455/452.2 |
| 2005/0285784 | A1* | 12/2005 | Chiang et al. ................. 342/359 |
| 2007/0086471 | A1 | 4/2007 | Igarashi et al. |
| 2007/0093271 | A1 | 4/2007 | Hovers et al. |

FOREIGN PATENT DOCUMENTS

| | | |
|---|---|---|
| JP | 2002-151936 A | 5/2002 |
| JP | 3562420 B2 | 9/2004 |
| JP | 2007-13624 A | 1/2007 |
| JP | 2007-19574 A | 1/2007 |
| JP | 2007-96898 A | 4/2007 |
| WO | 99/16221 A1 | 4/1999 |
| WO | 01/80356 A2 | 10/2001 |

OTHER PUBLICATIONS

Japanese Office Action dated Nov. 11, 2011 issued in corresponding Japanese Patent Application 2007-212334.

* cited by examiner

*Primary Examiner* — Hassan Phillips
*Assistant Examiner* — Gautam Sharma
(74) *Attorney, Agent, or Firm* — Fitzpatrick, Cella, Harper & Scinto

(57) ABSTRACT

A wireless communication apparatus, which is capable of operating in an active mode and a sleep mode, comprises an antenna control unit, which controls a half-value angle and a directivity angle of an antenna for communication, and a mode control unit, which controls a change between the active mode and the sleep mode. When the wireless communication apparatus is in the sleep mode, the antenna control unit sets the half-value angle of the antenna to be a larger half-value angle than the half-value angle with respect to the active mode, and sets the directivity angle of the antenna to a predetermined angle.

11 Claims, 30 Drawing Sheets

F I G. 6
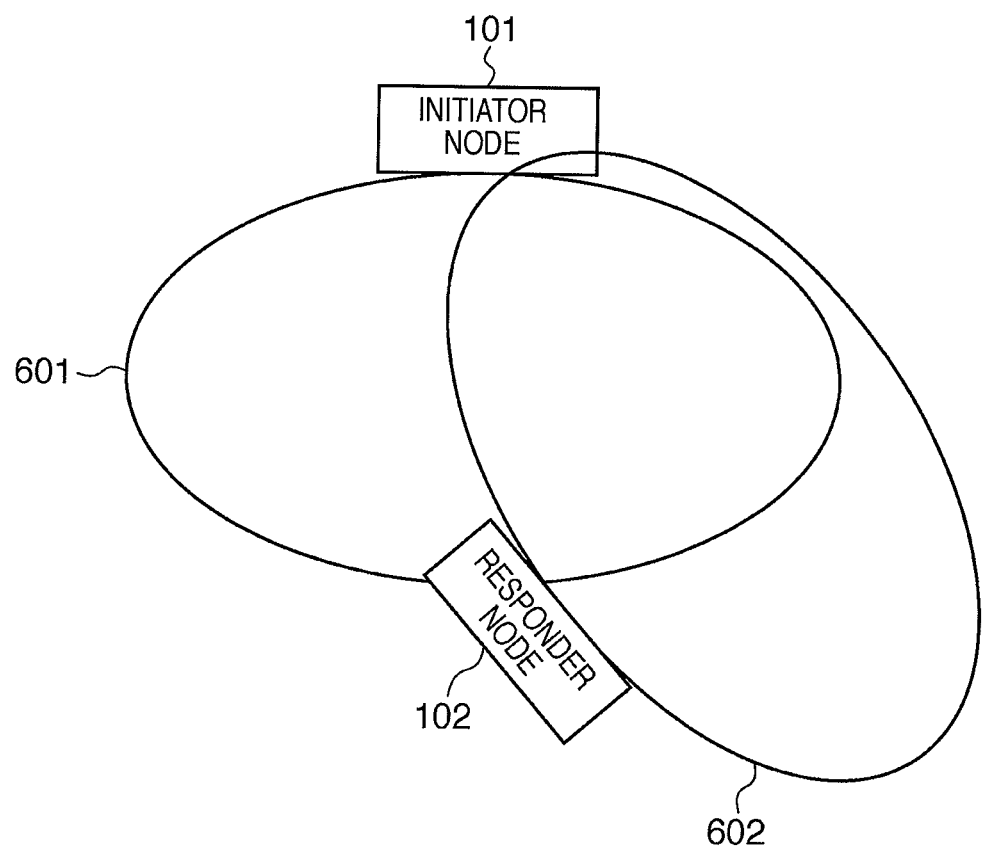

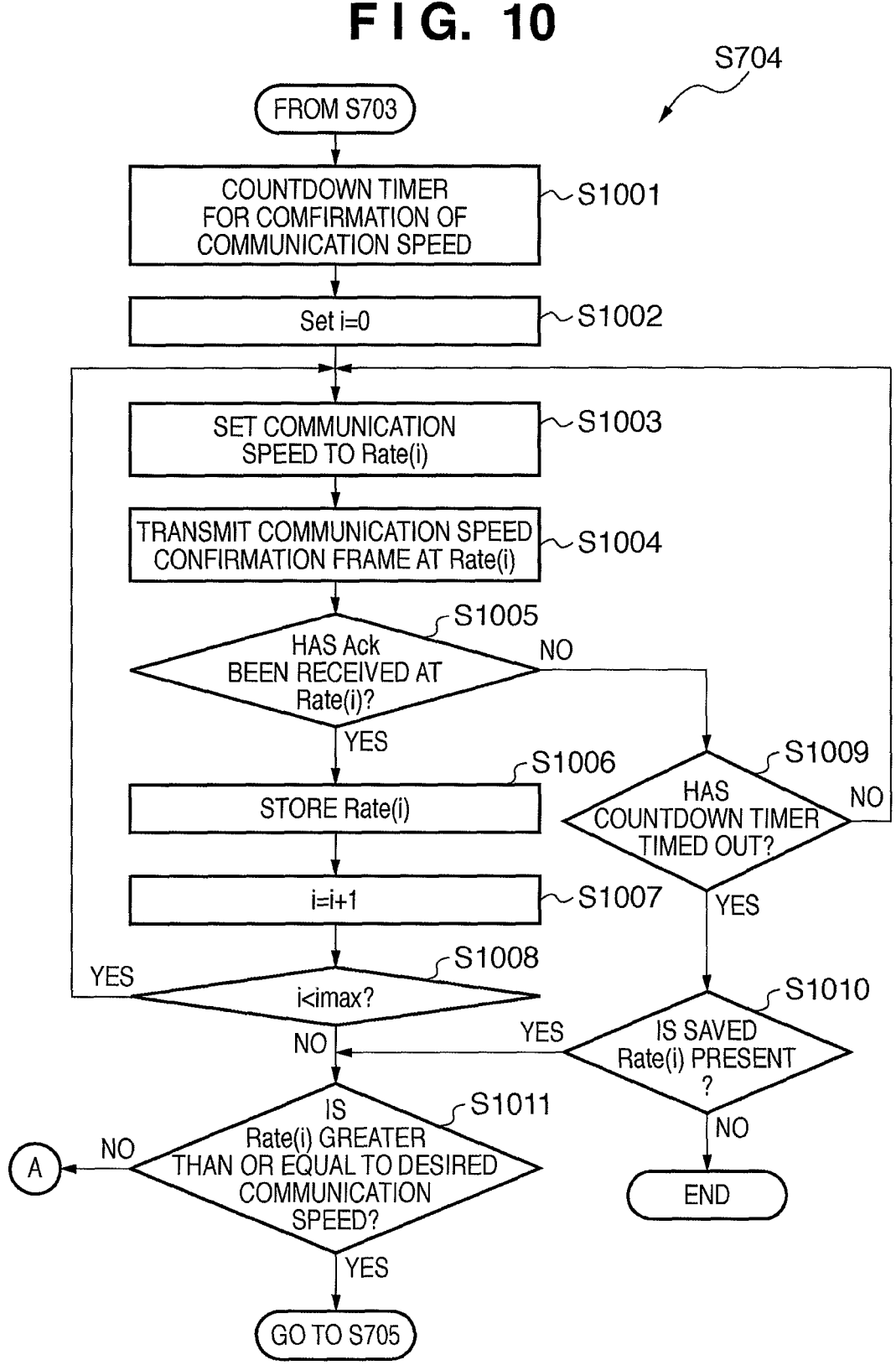
F I G. 10

F I G. 34
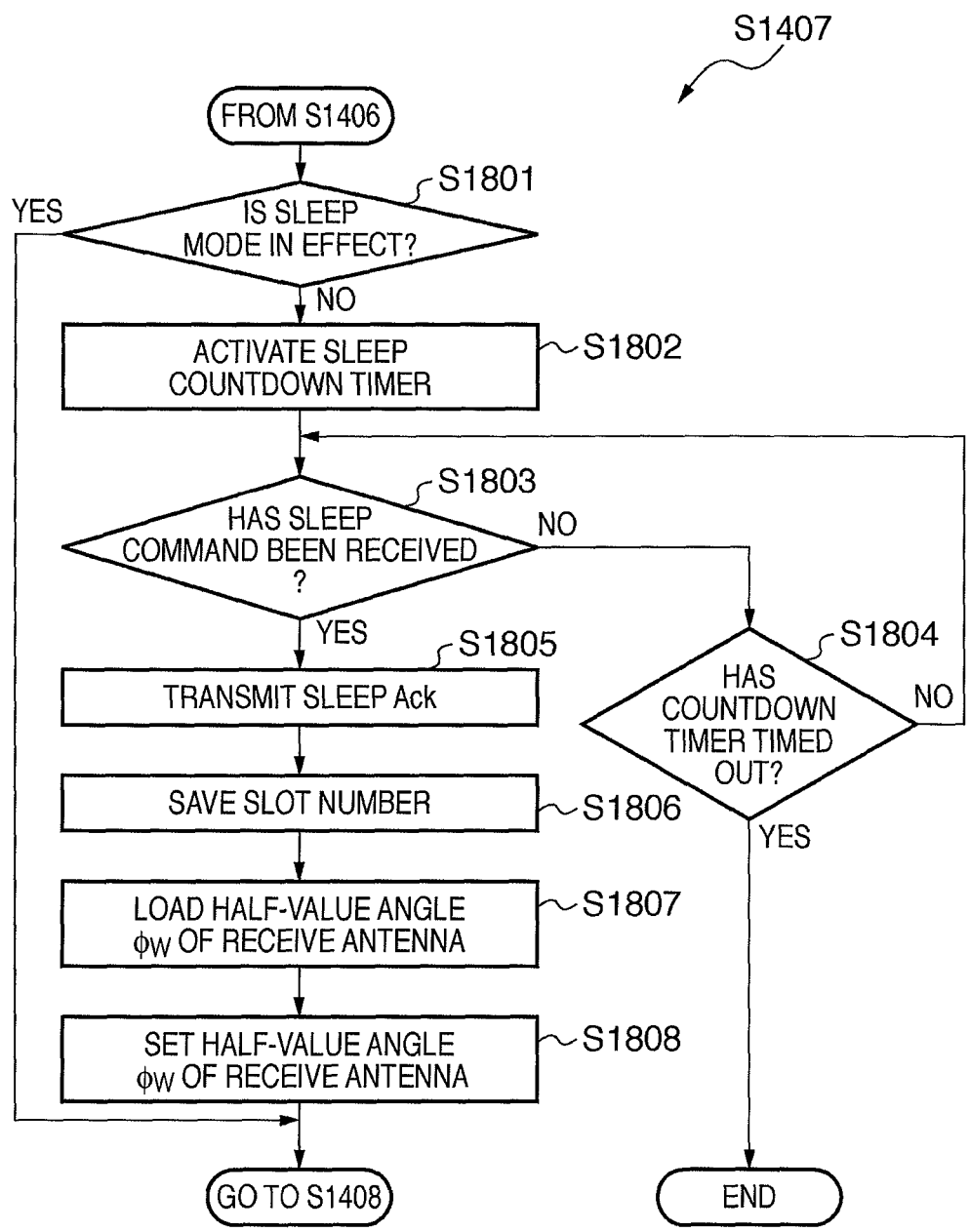

ions, and method
thereof that facilitate receiving, with improved accuracy, a
wake-up command after transitioning to a sleep mode, and
being able to perform a transition to an active mode with
improved accuracy as a result thereof.

According to one aspect of the present invention, there is
provided a wireless communication system, having a wireless
communication apparatus for operating in an active mode and
a sleep mode, the wireless communication system comprising:

an antenna control unit configured to control a half-value
angle and a directivity angle of an antenna of the wireless
communication apparatus; and a mode control unit configured to control a change between
the active mode and the sleep mode;

wherein when the wireless communication apparatus is in
the sleep mode, the antenna control unit sets the half-value
angle of the antenna to a larger half-value angle than the
half-value angle with respect to the active mode, and sets the
directivity angle of the antenna to a predetermined angle.

Also, according to another aspect of the present invention,
there is provided a wireless communication apparatus for
operating in an active mode and a sleep mode, comprising:

an antenna control unit configured to control a half-value
angle and a directivity angle of an antenna of the wireless
communication apparatus; and a mode control unit configured to control a change between
the active mode and the sleep mode;

wherein when the wireless communication apparatus is in
the sleep mode, the antenna control unit sets the half-value
angle of the antenna to a larger half-value angle than the
half-value angle with respect to the active mode, and sets the
directivity angle of the antenna to a predetermined angle.

Furthermore, according to one aspect of the present invention, there is provided a control method of a wireless communication apparatus for operating in an active mode and a
sleep mode, and controlling a half-value angle and a directivity angle of an antenna for a communication, the control
method comprising the steps of:

controlling a change between the active mode and the sleep
mode; and when the wireless communication apparatus is in the sleep
mode, setting the half-value angle of the antenna to a larger
half-value angle than the half-value angle with respect to the
active mode, and setting the directivity angle of the antenna to
a predetermined angle.

Further features of the present invention will become
apparent from the following description of exemplary
embodiments, with reference to the attached drawings.

BRIEF DESCRIPTION OF DRAWINGS

FIG. 6 describes a circumstance with regard to the configuration of the communication system wherein the transmission node and the reception node use the wide directivity antenna, wherein the direction of the reception node changes.

FIG. 10 is a flowchart that depicts an operation wherein the initiator node confirms a communication speed between the initiator node and the responder node.

FIG. 34 is a flowchart that depicts the operation when the responder node is in the sleep mode, according to the fourth embodiment.

BEST MODE FOR CARRYING OUT THE INVENTION

Exemplary embodiments of the present invention will now be described in detail, in accordance with the accompanying drawings.

First Embodiment

Figure 1:
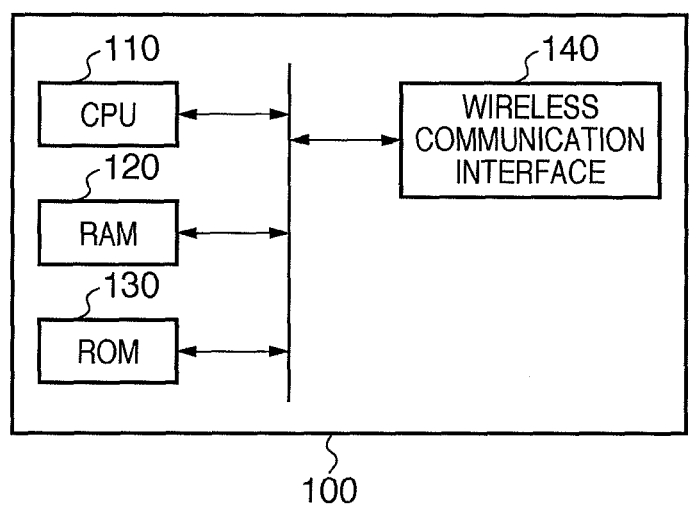
FIG. 1 is a block diagram depicting an instance of a configuration of a wireless communication apparatus according
to a first embodiment.

Following is a description of a configuration of a communication apparatus according to a first embodiment, with reference to FIG. 1. A communication apparatus 100 that includes a wireless communication function is capable of operating as an initiator node 101 and a responder node 102 (to be described hereinafter). Reference numeral 110 is a Central Processing Unit (CPU), which controls the communication apparatus 100 overall. The CPU 110 functions as a mode control unit, which switches between an active mode and a sleep mode with respect to the communication apparatus 100, and controls an execution of an operation with respect to each respective mode thereof. In the present circumstance, the sleep mode is a mode wherein the communication function is suspended, and the communication function is restored to an operational status intermittently, i.e., after a periodic interval. The transition between the communication function and the sleep mode is repeated thereby. The active mode, on the other hand, is a mode wherein the communication function is maintained in the operational status thereof. Reference numeral 120 is a Random Access Memory (RAM), which temporarily stores a program or a data. Reference numeral 130 is a Read Only Memory (ROM), which stores the program or a parameter for which an alteration thereof is not necessary. Reference numeral 140 is a wireless communication interface, which implements the wireless communication function. It is to be understood that is would be permissible for the communication apparatus 100 to be implemented in the configuration described herein, as well as to be implemented in a form that adds such as a storage device or a display device, as required.

Figure 2:
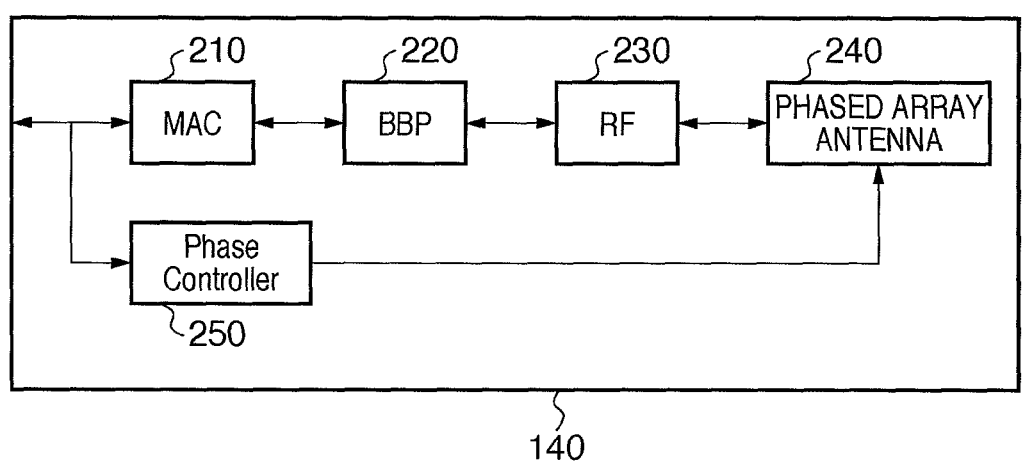
FIG. 2 is a block diagram depicting an instance of a configuration of a wireless communication interface according to
the first embodiment.

Following is a description of a configuration of the wireless communication interface 140, with reference to FIG. 2. Reference numeral 210 is a Medium Access Controller (MAC), which manages a medium access layer. Reference numeral 220 is a Base Band Processor (BBP), which includes a communication signal processing function, such as an error correction coding and decoding, as well as a modem function. Reference numeral 230 is a Radio Frequency (RF) block, which is for processing a base bandwidth signal with a carrier frequency band. Reference numeral 240 is a phased array antenna, which is for sending and receiving the carrier frequency band signal in a wireless region. Reference numeral 250 is a phase controller as an antenna control unit, which controls a half-value angle and a directivity angle of the phased array antenna 240.

Figure 3:
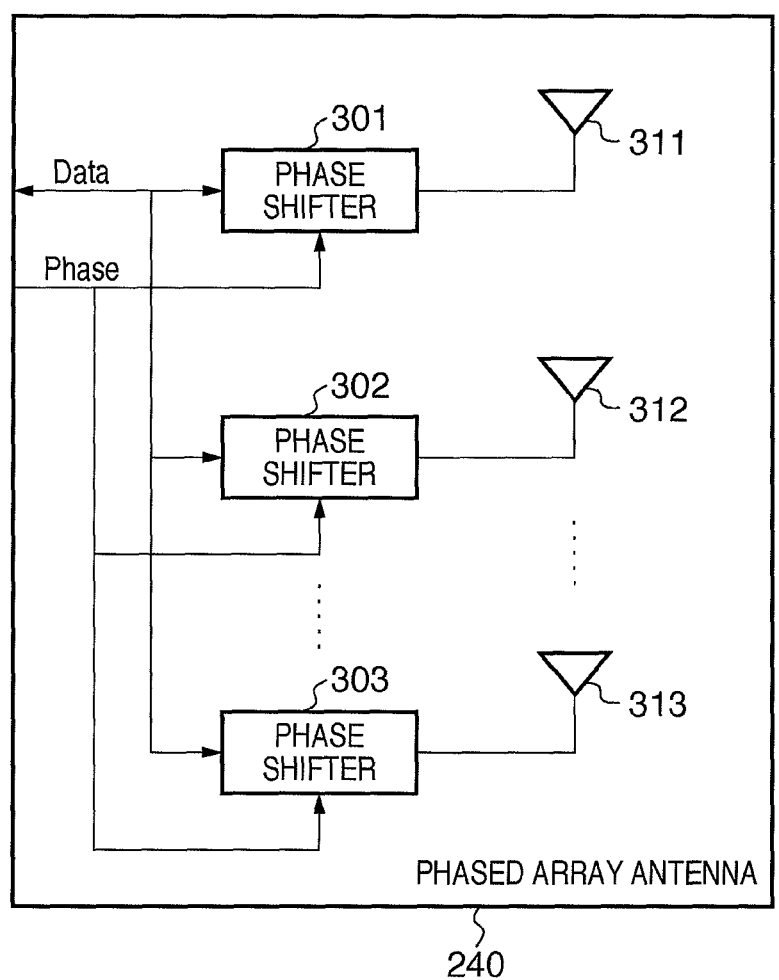
FIG. 3 is a block diagram depicting an instance of a configuration of a phased array antenna.

Following is a description of a configuration of the phased array antenna 240, with reference to FIG. 3. A plurality of antennae 311, 312, and 313 is installed in an array arrangement, and a phase shifter 301, 302, and 303 is connected to each antenna, allowing control of the half-value angle and the directivity angle thereof. A phase information is inputted from the phase controller 250 into each respective phase shifter 301, 302, and 303, in order to control the half-value angle and the directivity angle. The half-value angle and the directivity angle is employed, in accordance with the phase information thus inputted, to perform a transmission and a reception.

Figure 22:
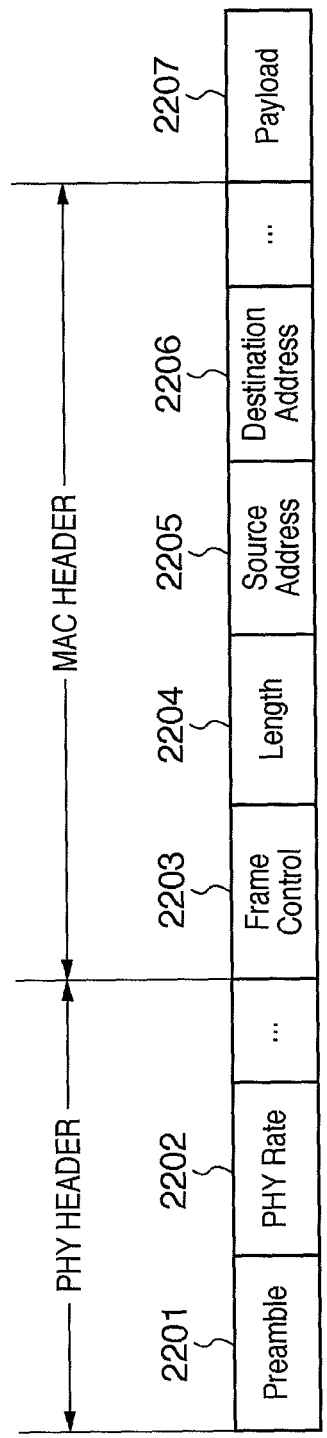
FIG. 22 depicts a configuration of a packet.

Following is a description of a packet frame format that the communication apparatus according to the first embodiment employs, with reference to FIG. 22. A physical layer (PHY) header is a portion that is processed with the BBP 220, and a MAC header is a portion that is processed with the MAC 210. The packet progresses from left to right, in a clockwise sequence. The PHY header is configured, at a minimum, from a preamble 2201, which is for a detection and a synchronization of the packet, and a PHY Rate 2202, which describes a physical layer speed that is used in a transmission of the packet. The MAC header is configured, at a minimum, from:

a Frame Control 2203, which describes a packet type;
a Length 2204, which describes a length of a Payload 2207;
a Source Address 2205, which describes an address of a transmission source; and
a Destination Address 2206, which describes an address of a transmission destination.

An identification is made with the type of the Frame Control 2203 of such as a beacon, a Request To Send (RTS), a Clear To Send (CTS), or an Acknowledge (Ack). The Payload 2207 follows after the MAC header.

Figure 7:
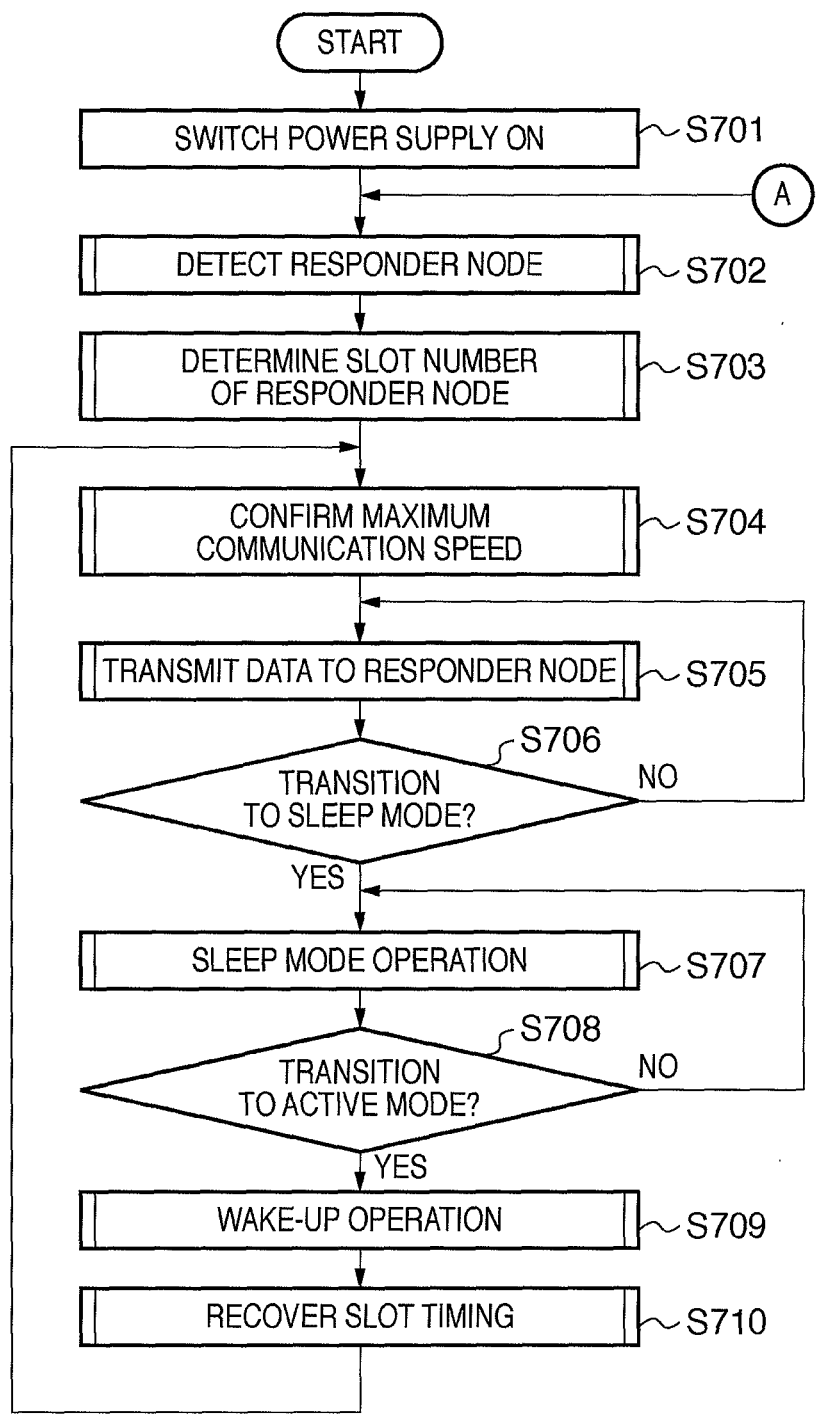
FIG. 7 is a flowchart that depicts an operation of an initiator node according to the first embodiment.

Following is a description of an operation of the initiator node 101, with reference to a flowchart that is depicted in FIG. 7. A program that implements the present operation flow is stored in the ROM 130, and is loaded and executed by the CPU 110 when a power supply is on thereto.

When the power supply of the initiator node 101 is on, as per step S701, then, in step S702, the responder node that is installed in a vicinity thereof is detected. In step S703, a time slot, i.e., a slot number, is assigned to the responder node that is thus detected.

In step S704, the initiator node 101 collaborates with the responder node to confirm a maximum communication speed therebetween. Thereafter, in step S705, the initiator node 101 employs the time slot that is assigned in step S703 and the communication speed to transmit a data to the responder node 102. In step S706, the initiator node 101 determines, based on such as a user determination or a timer, whether or not to transition to the sleep mode. If the initiator node 101 does not transition to the sleep mode, the process returns to step S705, wherein the data transmission continues.

If, on the other hand, it is determined in step S706 that the initiator node 101 transitions to the sleep mode, then, in step S707, the initiator node 101 executes a sleep mode operation. In step S708, the initiator node 101 determines, based on such as a user operation input or a timer, whether or not to transition to the active mode. If it is determined that the initiator node 101 does not transition to the active mode, the process returns to step S707, wherein the initiator node 101 continues the sleep mode operation. If, on the other hand, it is determined in step S708 that the initiator node 101 transitions to the active mode, then, in step S709, the initiator node 101 performs a wake-up operation. Thereafter, in step S710, the initiator node 101 recovers the slot number that was used prior to transitioning to the sleep mode, and the process returns to step S704, wherein the confirmation of the communication speed between the initiator node 101 and the responder node is preformed once more.

As per the description in FIG. 7, the sleep mode of the initiator node 101 is defined with step S707, and the active mode is defined as the rest of the flow thereof aside from step S707.

Figure 8:
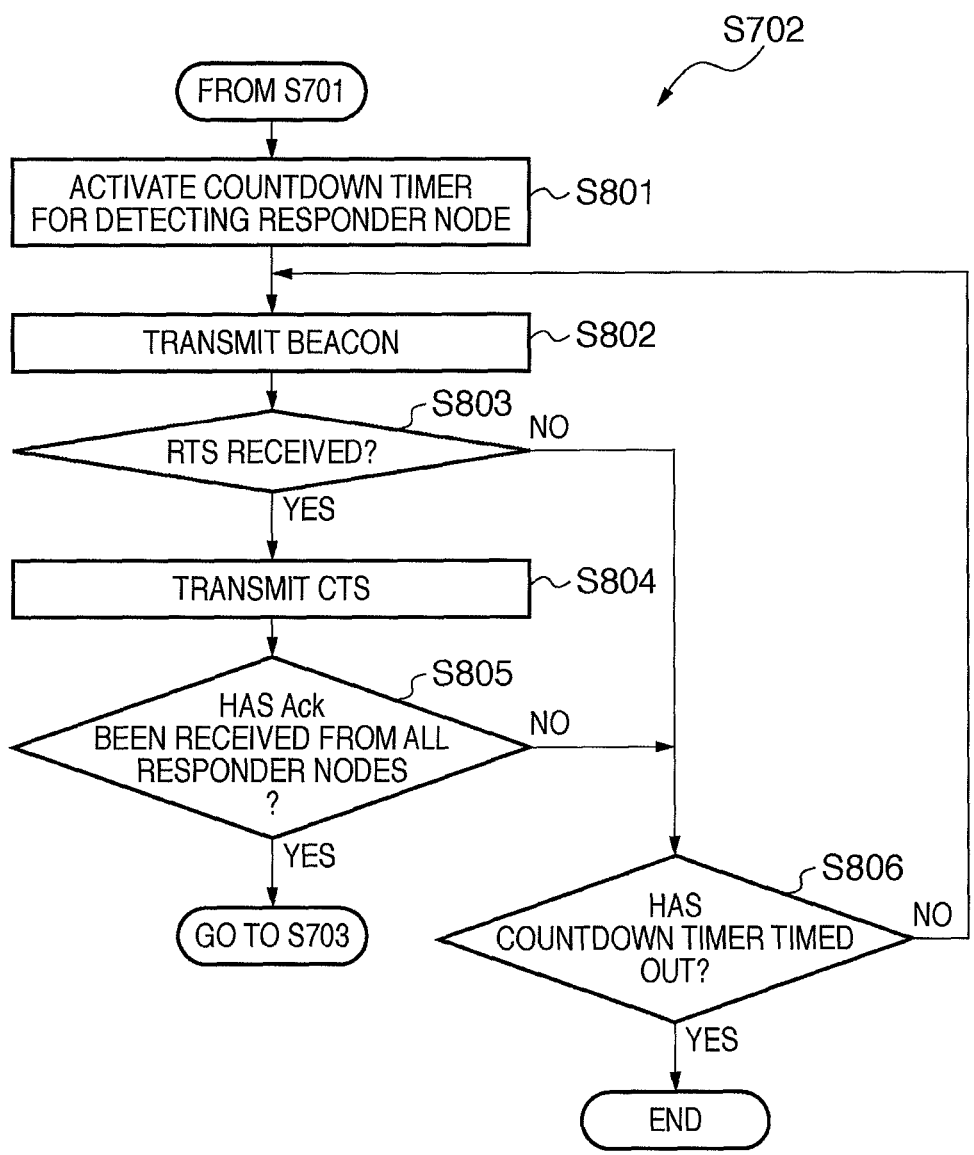
FIG. 8 is a flowchart that depicts an operation wherein the initiator node detects a responder node.
Figure 23:
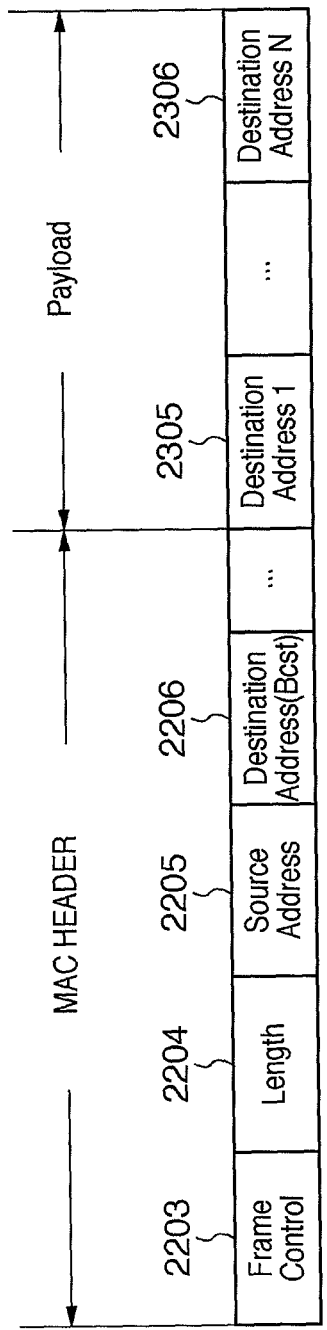
FIG. 23 depicts a configuration of a beacon frame.
Figure 24:
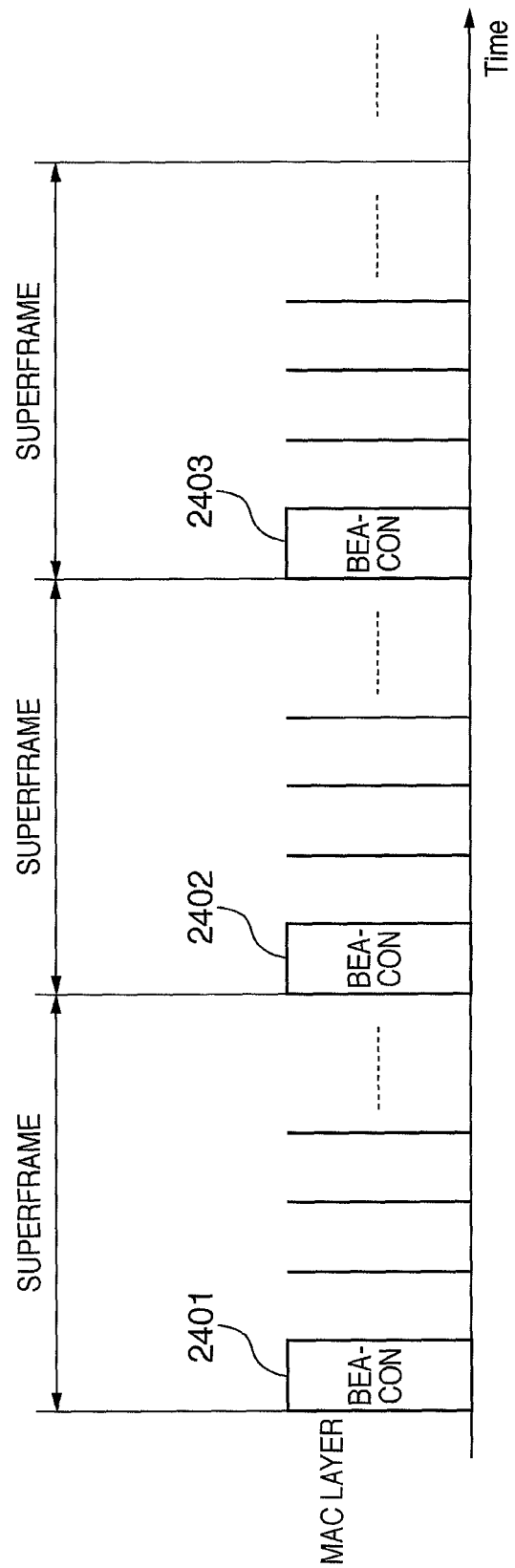
FIG. 24 depicts a timing of a beacon transmission.

Following is a more detailed description of the flow, with respect to step S702, of the operation of the detection of the responder node by the initiator node 101, with reference to FIG. 8. In step S801, the initiator node 101 resets a countdown timer that is assigned, within the CPU 110 thereof, for the detection of the responder node, and commences a countdown thereof, and, in step S802, commences a transmission of a beacon frame. A beacon frame format of a beacon frame that is transmitted in the present circumstance is as depicted in FIG. 23. In addition, a timing of the transmission of the beacon frame is as depicted in FIG. 24, and the initiator node 101 transmits the beacon frame (2401, 2402, 2403) on a per superframe basis.

In step S803, the initiator node 101 determines whether or not an RTS frame is received, and if a result of the determination thereof is true, then, in step S804, the initiator node 101 transmits a CTS frame. If, on the other hand, the result of the determination thereof is false, the process proceeds to step S806. In step S805, the initiator node 101 determines whether or not an Ack frame has been received from all of a desired quantity of responder nodes that are connected to the initiator node 101. The Ack frame is described, at a minimum, with an address of the responder node. Accordingly, by registering in the RAM 120 the address that is described in the Ack thus received, the initiator node 101 is capable of determining whether or not the Ack frame has been received from all of the responder node. If a result of the determination in step S805 is true, the sequence proceeds to the next process. If, on the other hand, the result of the determination in step S805 is false, the process proceeds to step S806. In step S806, the initiator node 101 determines whether or not the countdown timer for the detection of the responder node has timed out. If a result of the determination thereof is false, the process returns to step S802, whereupon the process described herein is repeated. If, on the other hand, the result of the determination in step S806 is true, then the execution of the program terminates.

Figure 9:
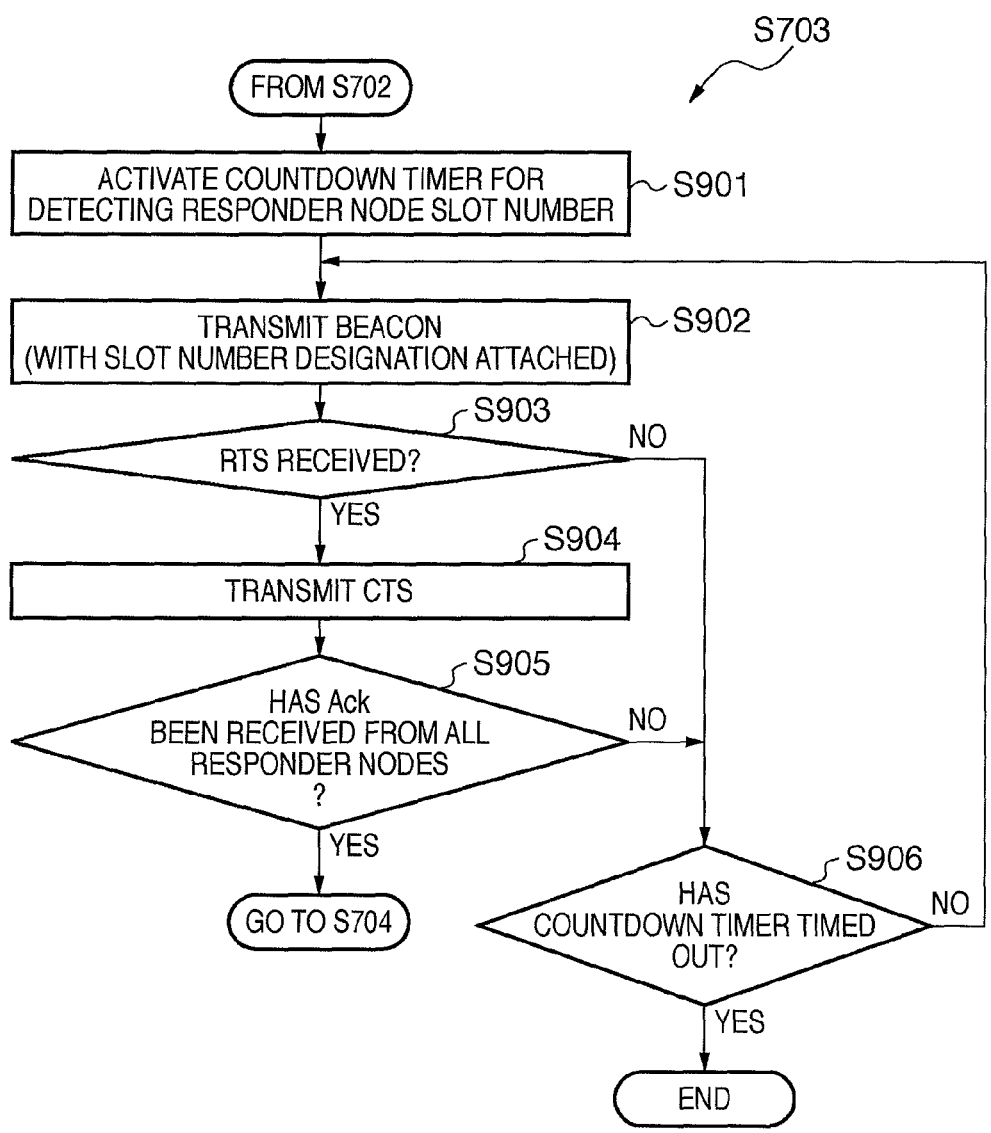
FIG. 9 is a flowchart that depicts an operation wherein the initiator node determines a slot number of the responder node.

Following is a more detailed description of the process in step S703, wherein the initiator node 101 determines the responder node slot number within the superframe, with reference to FIG. 9.

In step S901, the initiator node 101 resets the countdown timer that is assigned, within the CPU 110 thereof, for the detection of the responder node, and commences the countdown thereof, and, in step S902, commences the transmission of the beacon frame. The address of the responder node is described in a sequence in a payload of the beacon frame in the present circumstance, such as depicted in FIG. 23, i.e., a destination address 2305 and 2306, and is associated, in the sequence thereof, with the slot number after the initiator node slot. Put another way, if the initiator node slot number is zero, then, the slot number of the responder node that corresponds to the destination address 2305 is 1.

In step S903, the initiator node 101 determines whether or not the RTS frame is received, and if the result of the determination thereof is false, the process proceeds to step S906. If, on the other hand, the result of the determination thereof is true in step S903, then, in step S904, the initiator node 101 transmits the CTS frame.

In step S905, the initiator node 101 determines whether or not the Ack frame has been received from all of the desired quantity of responder nodes that are connected to the initiator node 101. The Ack frame is described, at a minimum, with the address of the responder node. Accordingly, by registering in the RAM 120 the address that is described in the Ack thus received, the initiator node 101 is capable of determining whether or not the Ack frame has been received from all of the responder node. If the result of the determination in step S905 is true, the sequence proceeds to the next process, and if the result of the determination in step S905 is false, the process in step S906 is performed. In step S906, the initiator node 101 determines whether or not the countdown timer for the detection of the responder node has timed out. If the result of the determination thereof is false, the process returns to step S902, whereupon the process described herein is repeated. If, on the other hand, the result of the determination in step S906 is true, then the execution of the program terminates.

Figure 25:
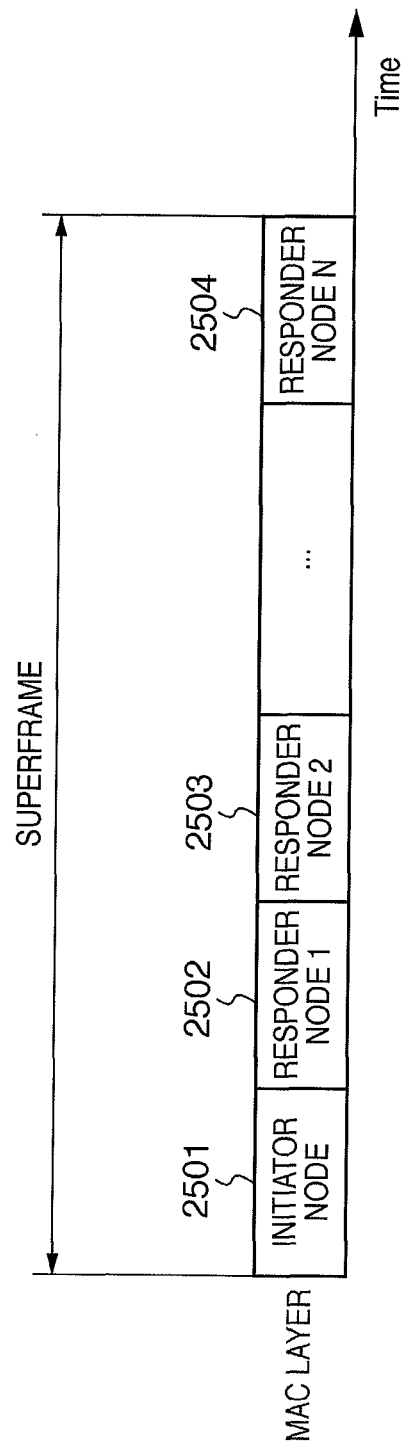
FIG. 25 depicts a timing of a transmission of the slot number.

FIG. 25 depicts an instance wherein the time slot of the initiator node 101 and the plurality of the responder node is determined within the superframe. A time slot 2501 of a header of the superframe is allocated to the initiator node 101. The responder node uses a time slot 2502, 2503, and 2504, which follow thereafter.

Figure 27:
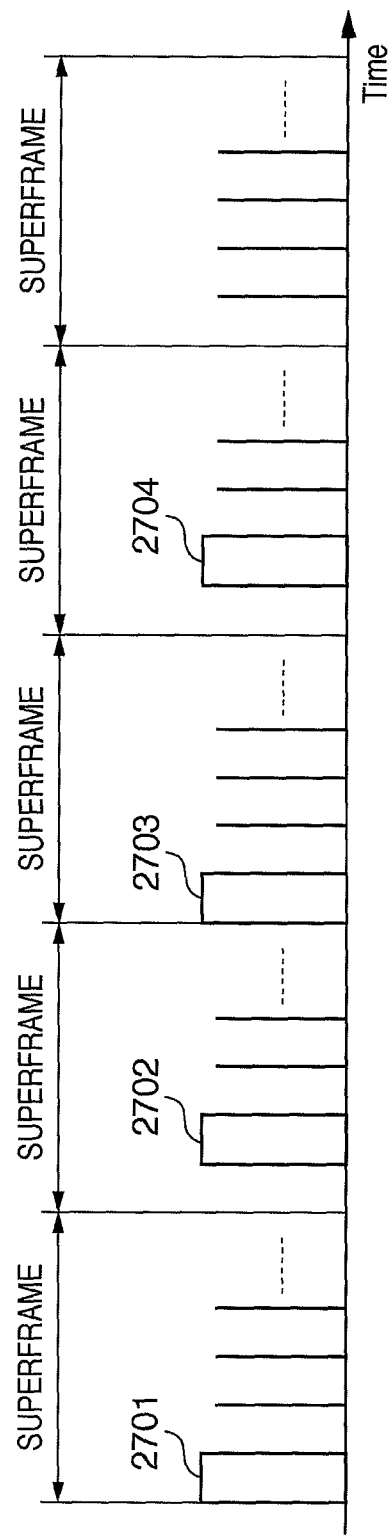
FIG. 27 depicts a timing of a frame transmission when confirming the communication speed.

FIG. 27 depicts an instance wherein the initiator node 101 transmits and receives the RTS and the CTS with the responder node after setting the slot number thereof. The initiator node 101 uses the slot number zero, and the initiator node 101 employs the slot thereof to transmit a communication speed confirmation frame 2701. The slot number 1 is assigned to the responder node 102, and the responder node 102 employs the slot thereof to transmit an RTS 2702 with regard to the superframe. The initiator node 101 employs the slot of the slot number zero to transmit a CTS 2703 with regard to a next superframe. The responder node 102 employs the slot of the slot number 1 to transmit a communication speed confirmation Ack 2704.

Following is a more detailed description of the process in step S704, wherein the initiator node 101 determines the communication speed between the initiator node 101 and the responder node, with reference to FIG. 10. In step S1001, the initiator node 101 resets and activates a countdown timer within the CPU 110 thereof for the confirmation of the communication speed thereof. In step S1002, the initiator node 101 sets a parameter i for changing the communication speed to zero.

In step S1003, the initiator node 101 sets a Rate(i) to the communication speed, and, in step S1004, the initiator node 101 uses the communication speed Rate(i) to transmit the communication speed confirmation frame. The frame type in the present circumstance is identified by the Frame Control 2203. In addition, the communication speed Rate(i) is at a slowest communication speed when i=0, and the communication speed gets faster as a value of i increases.

In step S1005, the initiator node 101 determines whether or not an Ack is received of the communication speed that is the same as the communication speed that the initiator node 101 has set. If the result of the determination in step S1005 is true, the process proceeds to step S1006, wherein the initiator node 101 saves the communication speed Rate(i) thereof in the RAM 120. If, on the other hand, the result of the determination thereof is false, the process proceeds to step S1009.

In step S1007, the initiator node 101 increments the parameter i in order to set a next communication speed thereof. If a value of the parameter i is below a maximum value imax in step S1008, then the process is executed again from step S1003. If, on the other hand, the value of the parameter i exceeds the maximum value imax in step S1008, the process proceeds to step S1011. In step S1009, the initiator node 101 determines whether or not the countdown timer for the communication speed has timed out, and if a result of the determination thereof is false, then the process is executed again from step S1003. If, on the other hand, the result of the determination thereof is true, the process proceeds to step S1010. In step S1010, the initiator node 101 determines whether or not the communication speed that is designated by the parameter i is saved, i.e., whether or not the Rate(i) exists that is saved in step S1006. If a result of the determination thereof is true, the process proceeds to step S1011, whereas if the result of the determination thereof is false, then the execution of the program terminates. In step S1011, the initiator node 101 determines whether or not the communication speed that is obtained by the process described herein is greater than or equal to a desired communication speed. If a result of the determination thereof is true, a next process is performed, whereas if the result of the determination thereof is false, the search for the responder node is performed once more, by beginning the process over again from step S702 in FIG. 7.

Figure 11:
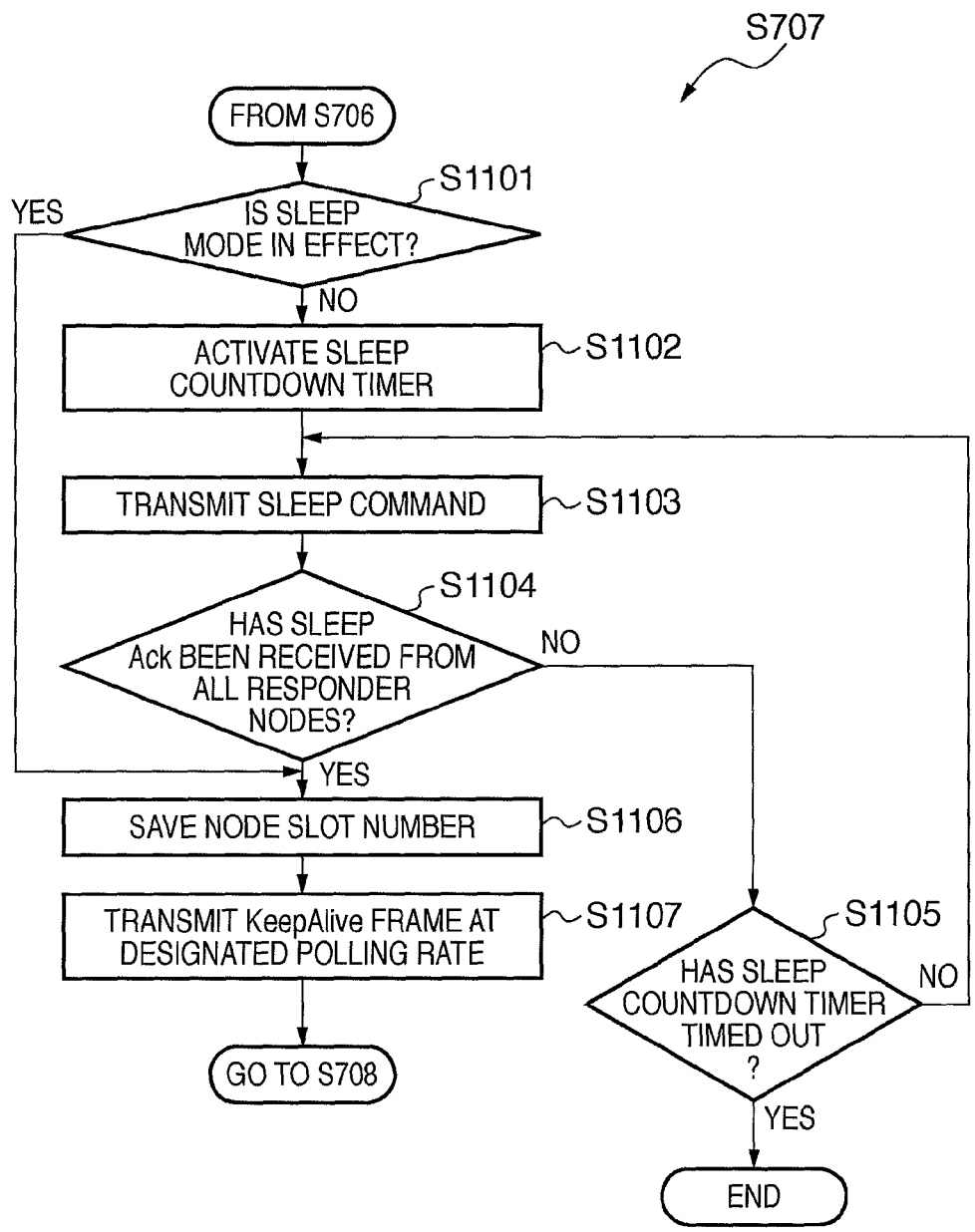
FIG. 11 is a flowchart that depicts an operation wherein the initiator node is in a sleep mode.

Following is a more detailed description of the sleep mode operation of the initiator node 101 in step S707, with reference to FIG. 11. In step S1101, the initiator node 101 determines whether or not the initiator node 101 is itself in the sleep mode, and if a result of the determination thereof is true, a process in step S1106 is performed. If the result of the determination in step S1101 is false, then, in step S1102, the initiator node 101 resets and activates a sleep countdown timer. In step S1103, the initiator node 101 directs a transition on the part of the initiator node to the sleep mode, by transmitting a sleep command. A payload within a sleep command frame describes a polling speed thereof.

In step S1104, the initiator node 101 determines whether or not a sleep Ack has been received from all of the responder node. If a result of the determination thereof is false, the process proceeds to step S1105. In step S1105, the initiator node 101 determines whether or not the sleep countdown timer has timed out. If a result of the determination thereof is false, the process is executed once more, beginning with step S1103. If the result of the determination in step S1105 is true, then the execution of the program terminates. If, on the other hand, the result of the determination in step S1104 is true, the process proceeds to step S1106. In step S1106, the initiator node 101 stores the slot number of all of the responder node in the RAM 120. In step S1107, the initiator node 101 transmits a KeepAlive frame at the polling speed, the notification whereof was performed in step S1103.

Figure 26:
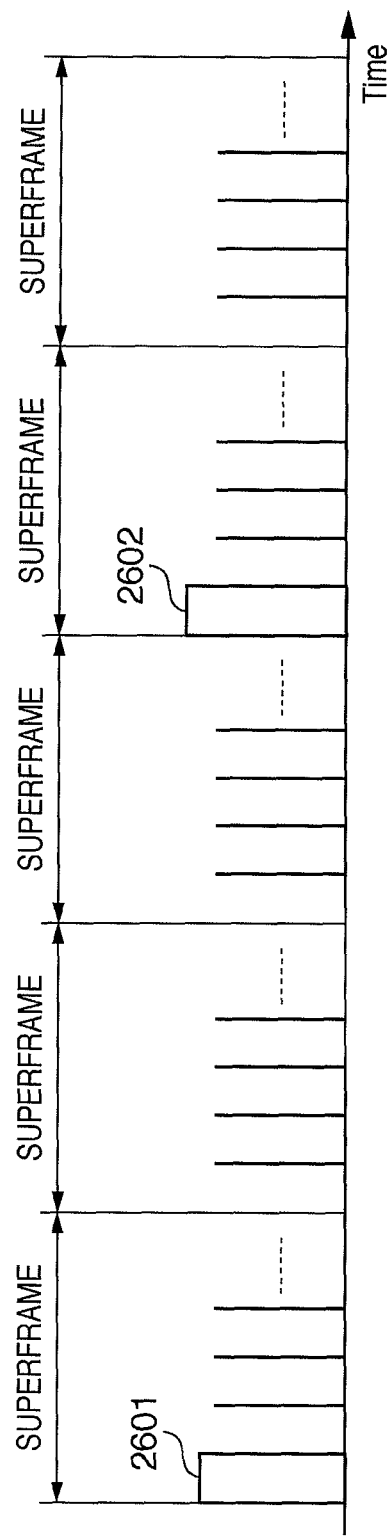
FIG. 26 depicts a timing of a transmission frame when the initiator node is in the sleep mode.

FIG. 26 depicts an instance of the polling speed of the KeepAlive frame. In FIG. 26, the initiator node 101 transmits the KeepAlive frame (2601, 2602) at three superframe intervals. The frame uses a low bit rate, which is defined with the PHY Rate 2202, and is transmitted with a large half-value angle, in order to improve a reliability of a signal that is received with the responder node 102.

Figure 12:
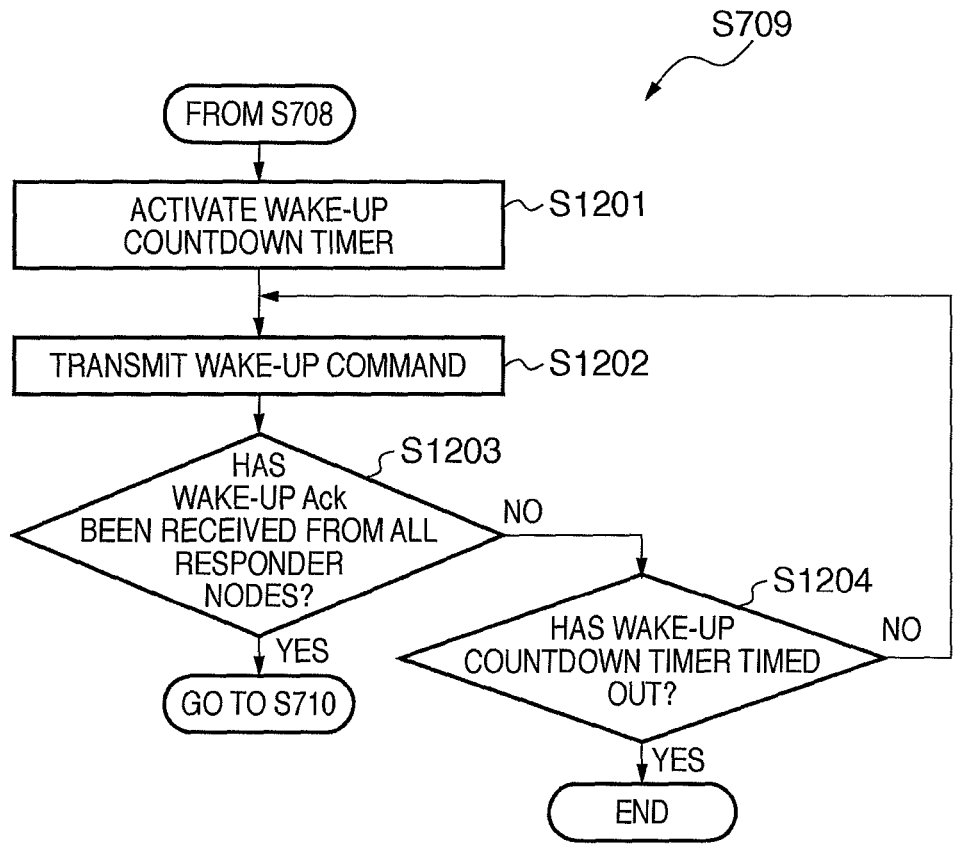
FIG. 12 is a flowchart that depicts an operation wherein the initiator node is waking up from the sleep mode.

Following is a more detailed description of the operation in step S709, wherein the initiator node 101 wakes up from the sleep mode, with reference to FIG. 12. In step S1201, the initiator node 101 resets, and then activates, a wake-up countdown timer. In step S1202, the initiator node 101 directs the responder node to transition to the active mode, by transmitting a wake-up command. In step S1203, the initiator node 101 determines whether or not a wake-up Ack has been received from all of the responder node. If a result of the determination in step S1203 is true, a next process, i.e., step S710, is performed, whereas, if the result of the determination thereof is false, the process proceeds to step S1204. In step S1204, the initiator node 101 determines whether or not the wake-up countdown timer has timed out. If a result of the determination in step S1204 is false, the process is executed once more, beginning with step S1202, whereas if the result of the determination thereof is true, then the execution of the program terminates.

Figure 13:
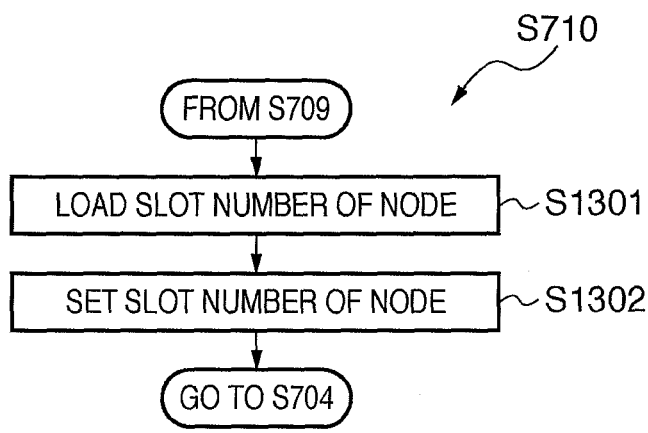
FIG. 13 is a flowchart that depicts an operation wherein the initiator node recovers the slot number of the responder node.

Following is a more detailed description of the operation in step S710, wherein the initiator node 101 recovers a slot timing of the responder node when waking up from the sleep mode, with reference to FIG. 13. In step S1301, the initiator node 101 loads a data that denotes a relation between the slot number that is saved in the RAM 120 in step S1106, and the responder node. In step S1302, the initiator node 101 sets the slot number and a receiver in accordance with the data thus loaded.

Figure 14:
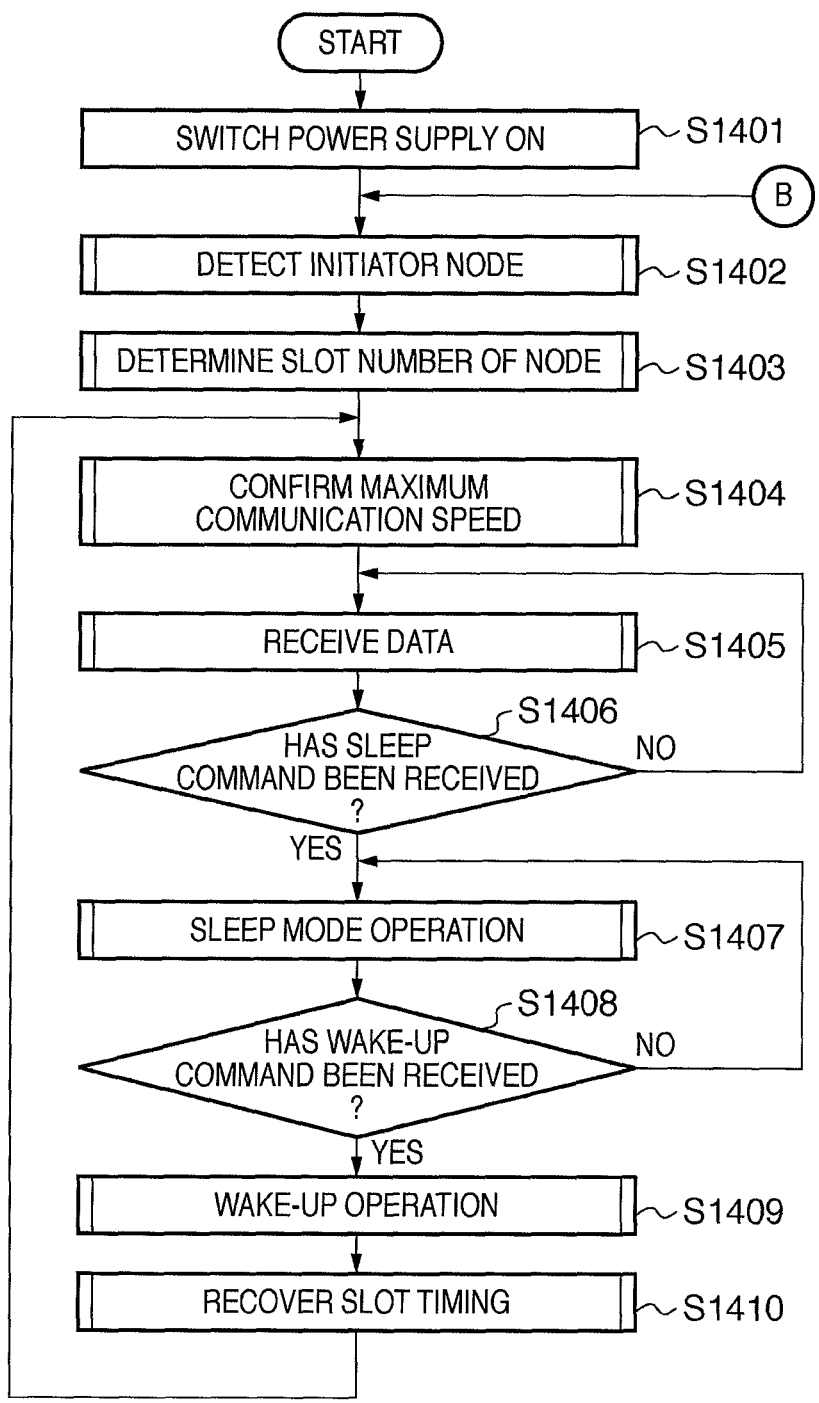
FIG. 14 is a flowchart that depicts an operation of the responder node according to the first embodiment.

The operation of the initiator node according to the first embodiment has herein been described in detail. Following is a description of an operation of the responder node 102 according to the first embodiment, with reference to a flowchart that is depicted in FIG. 14. It is to be understood that a program that implements the operating flow thereof is stored in the ROM 130 of the responder node 102, and is loaded and executed by the CPU 110 when a power supply is on thereto.

When the power supply of the responder node 102 is on, as per step S1401, then, in step S1402, the initiator node that is installed in a vicinity thereof is detected. In step S1403, the responder node 102 determines that the time slot thereof is the time slot that is assigned thereto by the initiator node that is thus detected. Thereafter, in step S1404, the responder node 102 collaborates with the initiator node 101 to confirm the maximum communication speed therebetween.

In step S1405, the responder node 102 receives the data at the time slot and the communication speed that the initiator node 101 has assigned thereto. In step S1406, the responder node 102 determines whether or not to transition to the sleep mode by determining whether or not the sleep command has been received from the initiator node. If the responder node 102 does not transition to the sleep mode, the responder node 102 returns the process to step S1405, and continues the data transmission in step S1405. If, on the other hand, it is determined that the responder node 102 does transition to the sleep mode, then, in step S1407, the responder node 102 performs the sleep mode operation.

In step S1408, the responder node 102 determines whether or not to transition to the active mode by determining whether or not the wake-up command has been received from the initiator node. If the responder node 102 does not transition to the active mode, the responder node 102 returns the process to step S1407, and continues the sleep mode operation. If, on the other hand, it is determined that the responder node 102 does transition to the active mode, then, in step S1409, the responder node 102 performs the wake-up operation. Thereafter, in step S1410, the responder node 102 recovers the slot number that was previously used thereby, and returns to step S1404, thereupon once more performing the confirmation of the communication speed between the responder node 102 and the initiator node. As per the description in FIG. 14, the sleep mode of the responder node 102 is defined with step S1407, and the active mode is defined as the rest of the flow thereof aside from step S1407.

Figure 15:
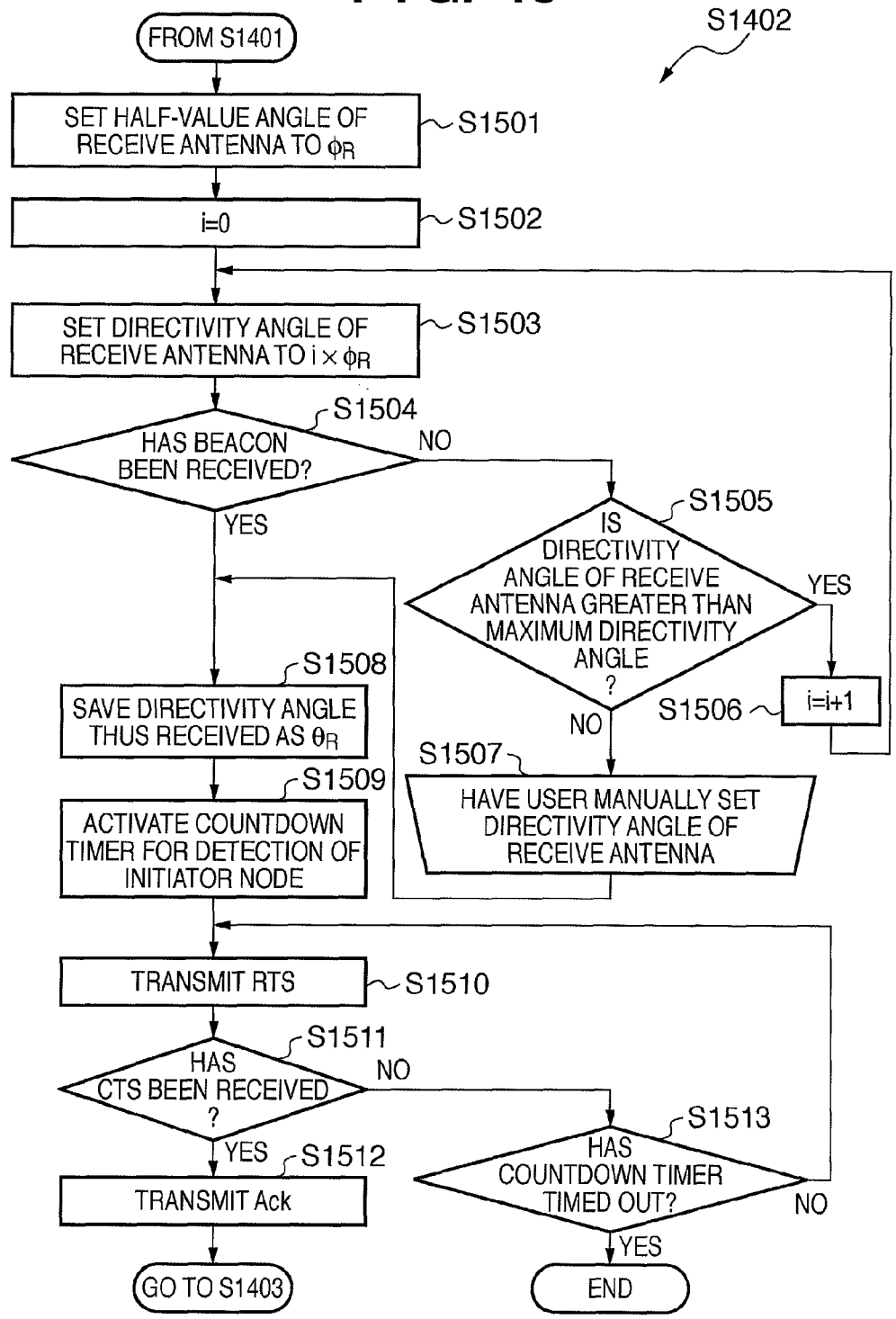
FIG. 15 is a flowchart that depicts an operation wherein the responder node detects the initiator node.

Following is a more detailed description of the flow, with respect to step S1402, of the operation of the detection of the initiator node 101 by the responder node 102, with reference to FIG. 15. In step S1501, the responder node 102 loads the half-value angle of the receive antenna from the ROM 130, and sets the half-value angle thereof to a narrow directivity $\phi_R$. In step S1502, the responder node 102 initializes a parameter i for changing the directivity angle of the receive antenna to zero.

In step S1503, the responder node 102 sets the directivity angle of the receive antenna to be equal to $i \times \phi_R$, in order to set the directivity angle thereof as a resolution $\phi_R$. In step S1504, the responder node 102 determines whether or not the beacon that is transmitted in each superframe is received thereby. If a result of the determination in step S1504 is true, then in step S1508, the responder node 102 stores the directivity angle $i \times \phi_R$ in the RAM 120 as a $\Theta_R$. If, on the other hand, the result of the determination in step S1504 is false, then in step S1505, the responder node 102 determines whether or not the directivity angle of the receive antenna is less than the maximum value thereof. If a result of the determination in step S1505 is true, then in step S1506, the parameter i is incremented, and the process is returned to step S1503. If the result of the determination in step S1505 is false, an inability to receive the beacon is signified thereby, and thus, in step S1507, the user is directed to set the directivity angle of the receive antenna. Thereafter, in step S1508, the responder node 102 stores the directivity angle thus set in the RAM 120 as the $\Theta_R$.

In step S1509, the responder node 102 resets and activates the countdown timer for detecting the initiator. In step S1510, the responder node 102 transmits the RTS to the initiator node 101. Thereafter, in step S1511, the responder node 102 determines whether or not the CTS has been received thereby from the initiator node 101. If a result of the determination in step S1511 is true, then in step S1512, the responder node 102 returns the Ack thereof to the initiator node 101. If, on the other hand, the result of the determination in step S1511 is false, the process proceeds to step S1513. In step S1513, the responder node 102 determines whether or not the countdown timer of the detection of the initiator has timed out. If a result of the determination in step S1513 is false, the process returns to step S1510, wherein the process described herein is executed once more. If, on the other hand, the result of the determination in step S1513 is true, then the execution of the program terminates.

Figure 16:
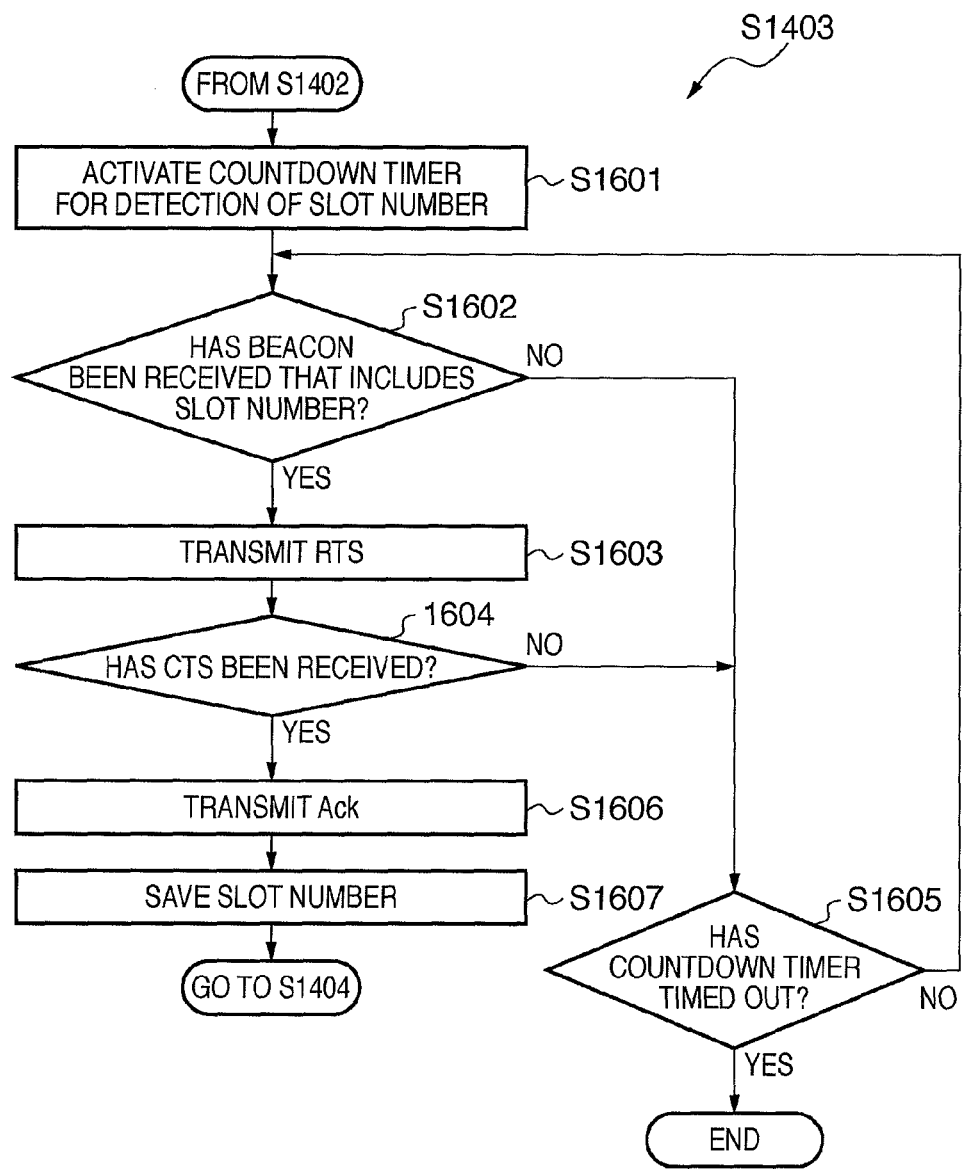
FIG. 16 is a flowchart that depicts an operation wherein the responder node acquires the slot number from the initiator node.

Following is a more detailed description of the operation in step S1403, wherein the responder node 102 acquires the slot number from the initiator node 101, with reference to FIG. 16. In step S1601, the responder node 102 resets and activates a countdown timer for detecting the slot number. In step S1602, the responder node 102 determines whether or not the beacon, with which the node slot address within the payload is described, is received. If a result of the determination in step S1602 is true, then in step S1603, the responder node 102 transmits the RTS to the initiator node 101. Thereafter, in step S1604, the responder node 102 determines whether or not the CTS has been received thereby from the initiator node 101. If a result of the determination in step S1604 is true, then in step S1606, the responder node 102 returns the Ack thereof to the initiator node 101. In step S1607, the responder node 102 saves in the RAM 120 the slot number that the responder node 102 has detected that is usable by the responder node 102.

If the result of the determination in either step S1602 or step S1604 is false, the process proceeds to step S1605. In step S1605, the responder node 102 determines whether or not the countdown timer of the detection of the slot number has timed out. If a result of the determination therein is false, the process returns to step S1602, wherein the process described herein is executed once more, whereas if the result of the determination therein is true, then the execution of the program terminates.

Figure 17:
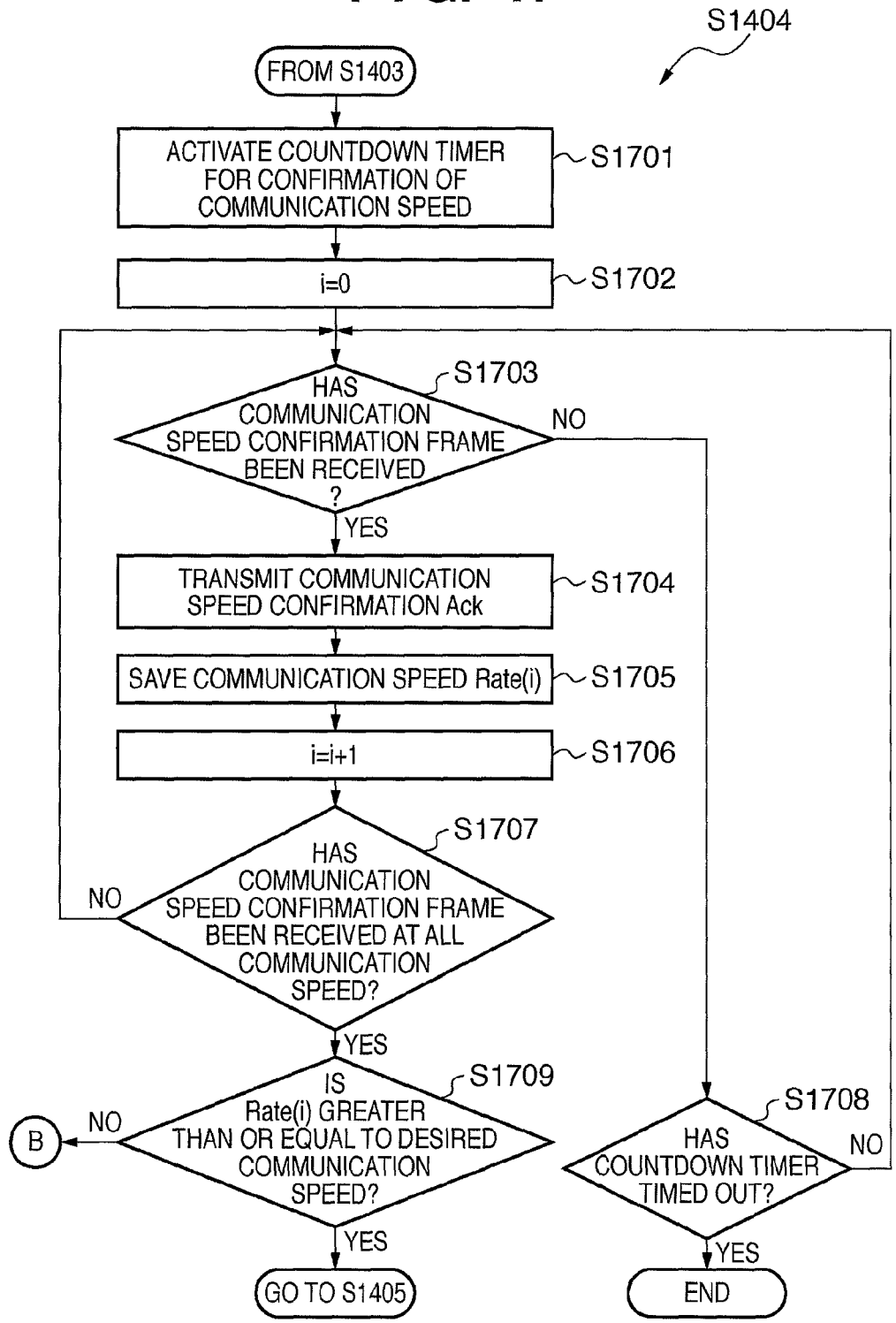
FIG. 17 is a flowchart that depicts an operation wherein the initiator node confirms the communication speed between the initiator node and the responder node.

Following is a more detailed description of the operation in step S1404, with reference to FIG. 17, wherein the responder node 102 determines the maximum communication speed between the responder node 102 and the initiator node. In step S1701, the responder node 102 resets and activates a countdown timer within the CPU 110 thereof for confirming the communication speed. In step S1702, the responder node 102 initializes the parameter i for changing the communication speed to zero. In step S1703, the responder node 102 determines whether or not the communication speed confirmation frame has been received thereby from the initiator node 101.

If a result of the determination in step S1703 is true, then in step S1704, the responder node 102 transmits the communication speed confirmation Ack at the same communication speed as the communication speed confirmation frame was received thereby in step S1703. Thereafter, in step S1705, the responder node 102 saves the communication speed Rate(i) in the RAM 120. In step S1706, the responder node 102 increments the parameter i. In step S1707, the responder node 102 determines whether or not the communication speed confirmation frame has been received at all of the communication speed that is defined with the PHY Rate 2202 of the PHY header. If a result of the determination in step S1707 is false, the process is executed once more, beginning with step S1703, whereas, if the result of the determination thereof is true, the process in step S1709 is executed instead. In step S1709, the responder node 102 determines whether or not the communication speed that is obtained in the preceding step is greater than or equal to a desired communication speed. If a result of the determination in step S1709 is true, then a next process is performed. If the result of the determination in step S1709 is false, the process is returned to step S1402 in FIG. 14, in order to perform a new search for the initiator node, and to perform the adjustment of the directivity angle. It is to be understood that the determination in step S1707 as to whether the reception at all of the Rate(i) has been achieved or not is performed as follows. The responder determines the Rate(i) of the response frame by analyzing the PHY header that is depicted in FIG. 22. More specifically, the CPU 110 that receives the frame from the wireless communication interface 140 detects whether or not the Rate(i) is a Rate(i) whereto the responder is capable of responding, by analyzing the PHY Rate 2202 that is within the header thereof. The Rate(i) that the responder is capable of responding to is preset within the responder, and a determination is made as to whether or not a quantity thereof matches. Specifically, the quantity of the Rate(i) that is stored in the ROM 130 is compared with the quantity of the Rate(i) that is obtained with the CPU 110, and a determination made as to whether or not all of the Rate(i) has been received while temporarily storing a result of the comparison thereof in the RAM 120.

If, on the other hand, the result of the determination in step S1703 is false, the process proceeds to step S1708. In step S1708, the responder node 102 determines whether or not the countdown timer for the communication speed has timed out. If a result of the determination thereof is false, then the process is executed again from step S1703. If the result of the determination in step S1708 is true, then the execution of the program terminates.

Figure 18:
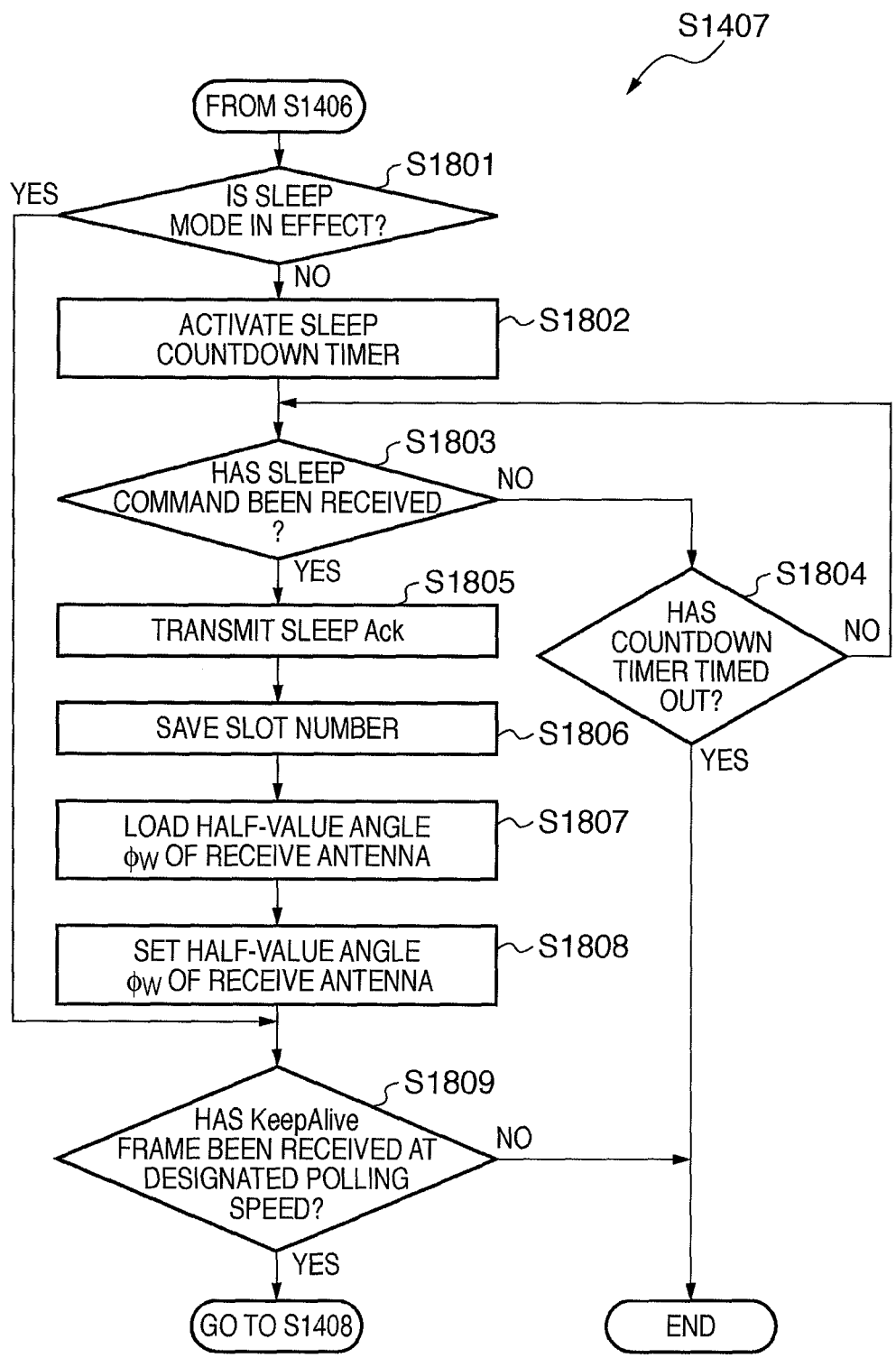
FIG. 18 is a flowchart that depicts an operation wherein the responder node is in the sleep mode.

Following is a more detailed description of the operation in step S1407, wherein the responder node 102 is in the sleep mode, with reference to FIG. 18. In step S1801, the responder node 102 determines whether it is in the sleep mode. If a result of the determination in step S1801 is true, then a process in step S1809 (to be described hereinafter) is performed. If the result of the determination in step S1801 is false, or put another way, the responder node 102 is not in the sleep mode, then in step S1802, the responder node 102 resets and activates the sleep countdown timer. In step S1803, the responder node 102 determines whether or not the sleep command, the polling speed whereof is described within the payload, is received from the initiator node 101. If a result of the determination in step S1803 is false, a process in step S1804 is performed. In step S1804, the responder node 102 determines whether or not the sleep countdown timer has timed out. If a result of the determination in step S1804 is false, then the process is executed again from step S1803, whereas if the result of the determination in step S1804 is true, then the execution of the program terminates.

If, on the other hand, the result of the determination in step S1803 is true, then in step S1805, the responder node 102 transmits the sleep Ack. In step S1806, the responder node 102 saves the receive slot number thereof in the RAM 120. Put another way, in step S1806, the responder node 102 stores the timing of the receive with respect to the active mode thereof in the RAM 120. In step S1807, the responder node 102 loads a half-value angle $\phi_W$ of the receive antenna from the ROM 130, in order to set the wide directivity. Thereafter, in step S1808, the responder node 102 sets the $\phi_W$ thus loaded to the phased array antenna 240 It is to be understood that, in such a circumstance, the directivity angle is set to a predetermined value. Put another way, if the responder node 102 is in the sleep mode, the phase controller 250 sets the half-value angle of the antenna to a larger half-value angle than the half-value angle with respect to the active mode, and sets the directivity angle of the antenna to the predetermined angle. In step S1809, the responder node 102 determines whether or not the KeepAlive frame is received from the initiator node 101 at the polling speed that is set with the sleep command. If a result of the determination in step S1809 is true, a next process is performed, whereas if the result of the determination thereof is false, then the execution of the program terminates.

Figure 19:
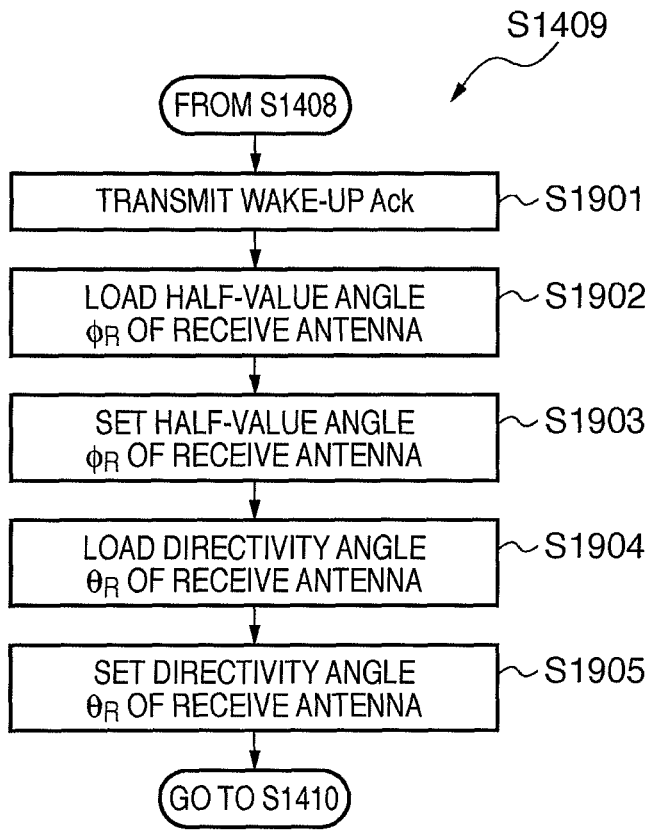
FIG. 19 is a flowchart that depicts an operation wherein the responder node is waking up from the sleep mode.

Following is a more detailed description of the operation in step S1409, wherein the responder node 102 wakes up from the sleep mode, with reference to FIG. 19. In step S1901, the responder node 102 notifies the initiator node that the responder node 102 has transitioned to the active mode by transmitting the wake-up Ack thereto. In step S1902, the responder node 102 loads a half-value angle $\phi_R$ of the receive antenna from the ROM 130, in order to set a narrow directivity. In step S1903, the responder node 102 sets the half-value angle $\phi_R$ of the receive antenna to the phased array antenna 240. The half-value angle $\phi_R$ is the half-value angle that is employed in step S1501. In step S1904, the responder node 102 loads the directivity angle $\Theta_R$ of the receive antenna, which is stored in the RAM 120 in step S1508, therefrom. In step S1905, the responder node 102 sets the directivity angle $\Theta_R$ of the receive antenna, which is loaded in step S1904, to the phased array antenna 240.

As described herein, in step S1508, the responder node 102 according to the embodiment stores the directivity angle of the antenna with respect to the active mode. Thereafter, in step S1905, when transitioning from the sleep mode to the active mode, the directivity angle of the antenna thus stored is employed to perform the communication.

Figure 20:
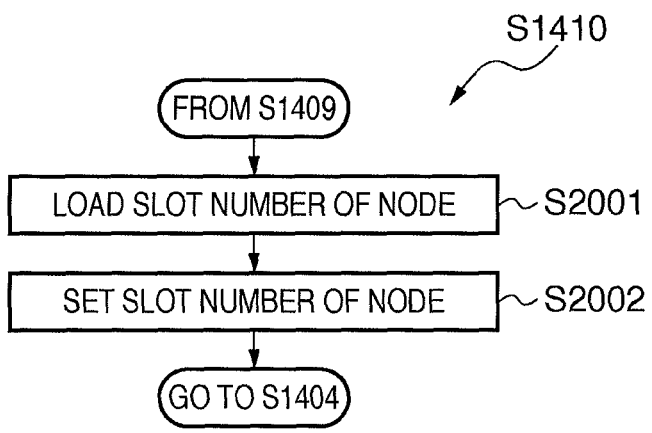
FIG. 20 is a flowchart that depicts an operation wherein the responder node recovers the slot number of the responder node.

Following is a more detailed description of the operation in step S1410, wherein the responder node 102 recovers the slot timing thereof when the responder node wakes up from the sleep mode, with reference to FIG. 20. In step S2001, the responder node 102 loads the slot number that is stored in the RAM 120. In step S2002, the responder node 102 sets the slot number in accordance with the data that is thus loaded. When the responder node 102 transitions from the sleep mode to the active mode, the timing thereof, i.e., the timing that is determined with the slot number, which is stored in the RAM 120 in step S1806, is used thereby to reopen the communication.

As described herein, when transitioning to the sleep mode, the responder node 102 enlarges the half-value angle of the phased array antenna 240 and reliably performs the reception of the wake-up command. Thereafter, when transitioning to the active mode in response the reception of the wake-up command thereby, the antenna is controlled thereby to the half-value angle and the directivity angle that was used prior to transitioning to the sleep mode, and the slot timing is restored to the timing that was used prior to the transition to the sleep mode as well. It is to be understood that after the recovery thereof of the half-value angle and the directivity angle of the antenna, as well as of the slot timing, the process returns to step S1404, whereupon the confirmation of the maximum communication speed is performed. Accordingly, if it is determined that the desired communication speed cannot be obtained, or that the communication cannot be carried out, via the half-value angle and the directivity angle thus recovered, then step S1402 is executed once more, and in step S1709, the directivity angle of the antenna is searched for.

Figure 21:
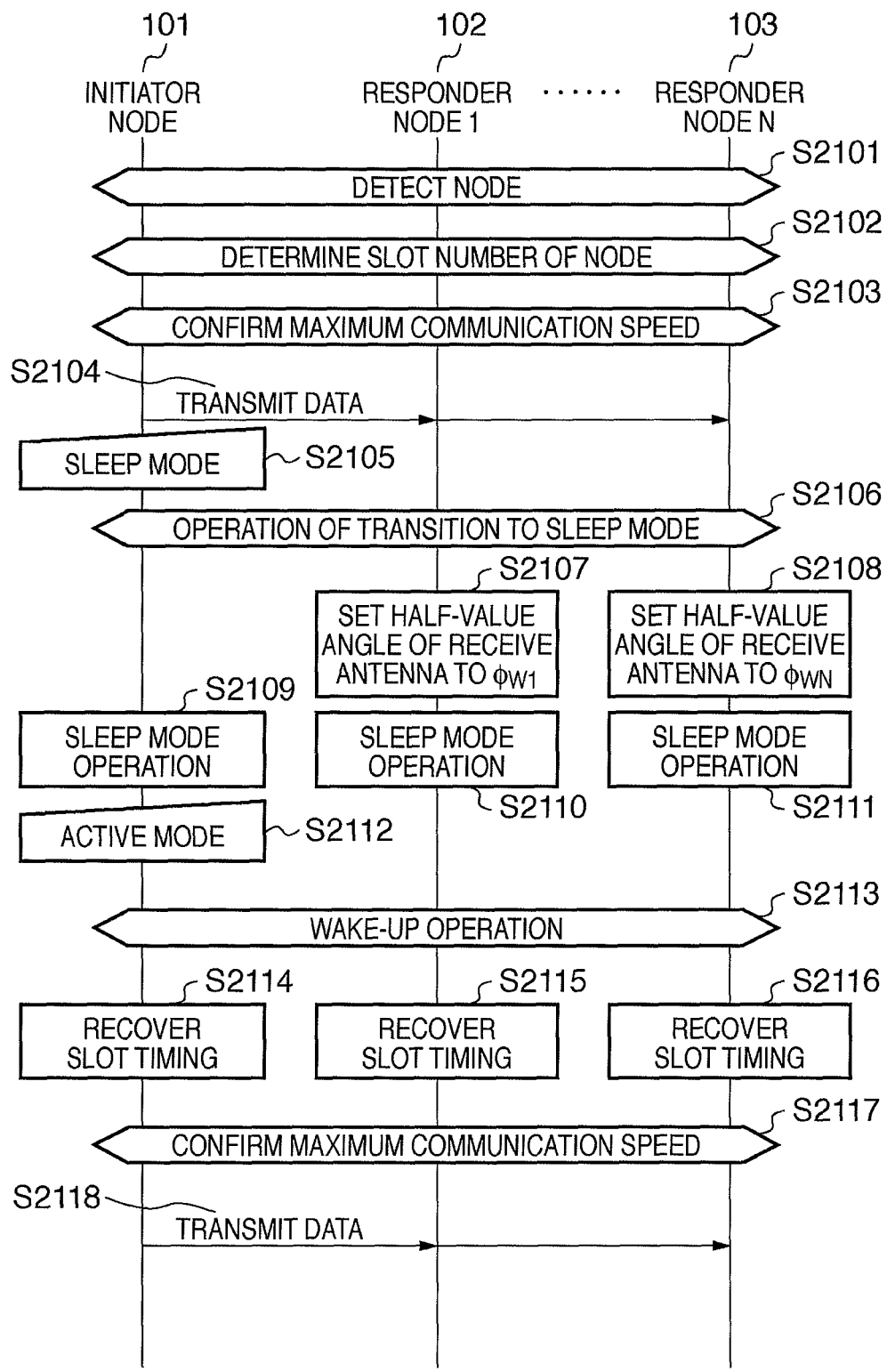
FIG. 21 is a message sequence chart of the initiator node and the responder node.

FIG. 21 depicts a message sequence chart when the wireless communication system, which employs the communication apparatus according to the first embodiment, operates.

The initiator node 101 performs the communication with n responder nodes. Following is a description of an operation with regard to the responder node 102 and 103 from among the n responder nodes, wherein the operation of the other n responder nodes is similar thereto. In step S2101, the initiator node 101 and the responder node 102 and 103 perform the collaboration operation, and, as per step S702 and S1402, detect one another's nodes, whereupon the responder node 102 and 103 determine the directivity angle of the receive antenna. In step S2102, the initiator node 101 and the responder node 102 and 103 perform the collaboration operation, and, as per step S703 and S1403, detect the slot number within the superframe. In step S2103, the initiator node 101 and the responder node 102 and 103 perform the collaboration operation, and, as per step S704 and S1404, confirm the communication speed upon a transmission path. In step S2104, the initiator node 101 employs the parameter that is obtained in the preceding step to transmit the data, as per step S705 and S1405.

In step S2105, the command to transition to the sleep mode is performed upon the initiator node 101, by way of such as the user command or the timer operation, as per step S706. In step S2106, the initiator node 101 and the responder node 102 and 103 perform the collaboration operation, and, as per step S706, S707, S1406, and S1407, perform the transition to the sleep mode operation. In step S2107 and S2108, the responder node 102 and 103 as per step S1807 and S1808, set the directivity angle of the receive antenna for standby state during the sleep mode. In step S2109, S2110, and S2111, each of the respective initiator node 101 and the responder node 102 and 103 execute the operation during the sleep mode.

In step S2112, the command to transition to the active mode is performed upon the initiator node 101, by way of such as the user command or the timer operation, as per step S708. In step S2113, the initiator node 101 and the responder node perform the collaboration operation, and, as per step S708, S709, S1408, and S1409, perform the wake-up operation. In step S2114, S2115, and S2116, the initiator node 101 and the responder node 102 and 103 execute the operation of recovering the slot timing, as per step S710 and S1410. In step S2117, in similar fashion as S2103, the initiator node 101 and the responder node perform the collaboration operation, and confirm the communication speed upon the transmission path. Thereafter, in step S2118, the initiator node 101 transmits the data.

Figure 4:
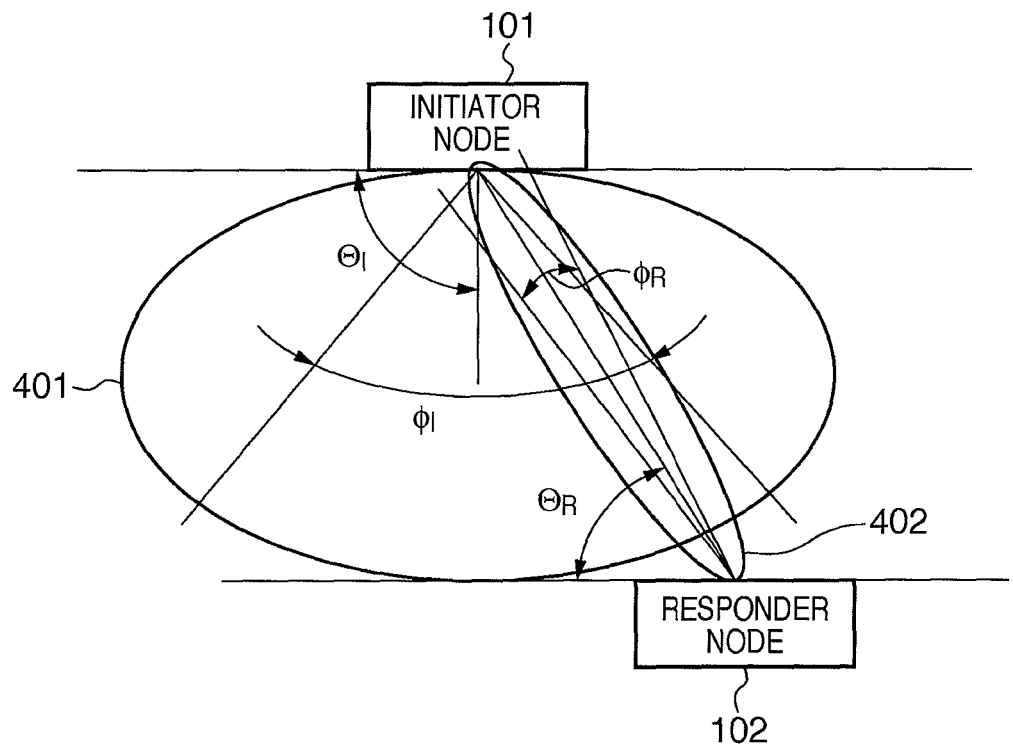
FIG. 4 is a block diagram depicting a configuration of a
communication system in a circumstance wherein a transmission node uses a wide directivity antenna, and a reception
node uses a narrow directivity antenna.
Figure 5:
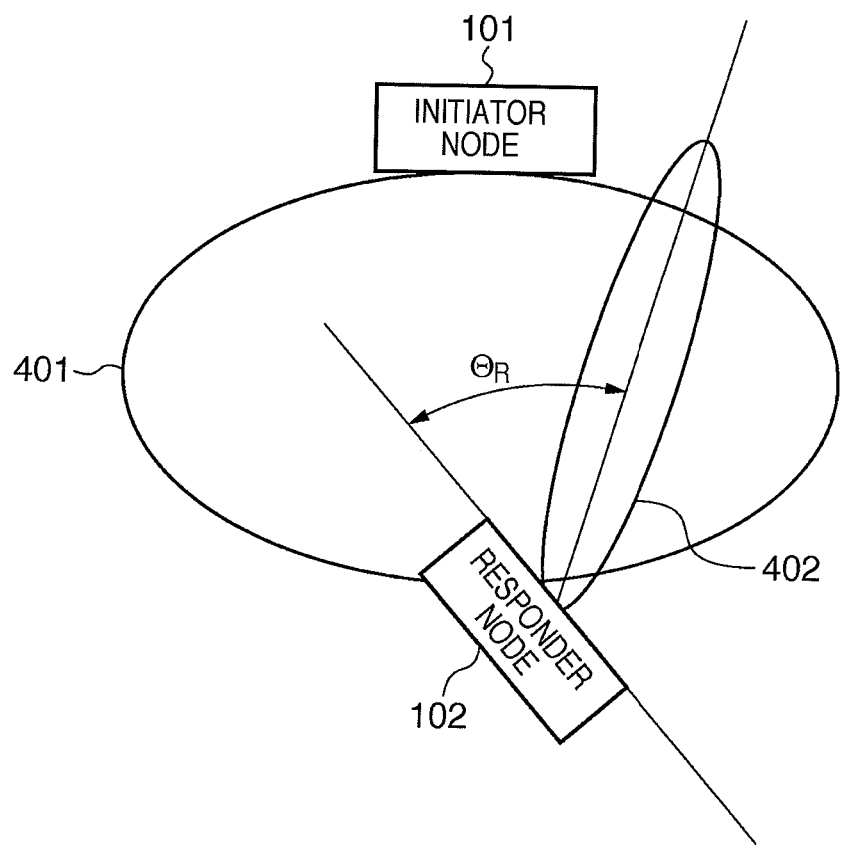
FIG. 5 describes a circumstance with regard to the configuration of the communication system wherein the transmission node uses the wide directivity antenna, and the reception node uses the narrow directivity antenna, wherein a direction of the reception node changes.

FIG. 6 describes a directivity of the transmit antenna and the receive antenna when the wireless communication system according to the embodiment operates in the sleep mode. FIG. 6 depicts, as an instance, the half-value angle, i.e., the directivity, when the transition to the sleep mode is executed with respect to the wireless communication system, wherein the initiator node 101 and the responder node 102 establish the communication therebetween, such as is depicted in FIG. 4. Put another way, the initiator node 101 enters the sleep mode with the transmit antenna set to the wide directivity, and the responder node 102 enters the sleep mode with the receive antenna set to the wide directivity as well. A transmit coverage area of the initiator node 101 is denoted by reference numeral 601. A receive coverage area of the responder node 102 is denoted by reference numeral 602. It is possible for the responder node 102 to receive the data from the initiator node 101 even if the responder node 102 should change the direction thereof during sleep, such as is depicted from FIG. 4 to FIG. 6. As a consequence thereof, it is possible for the responder node 102 to receive the wake-up command that is transmitted thereto when the initiator node 101 attempts to wake up from the sleep mode to the active mode.

Second Embodiment

A configuration of a communication apparatus and a communication system according to a second embodiment is similar to the configuration of the communication apparatus and the communication system according to the first embodiment. The second embodiment adds a change to the program thereof.

Figure 28:
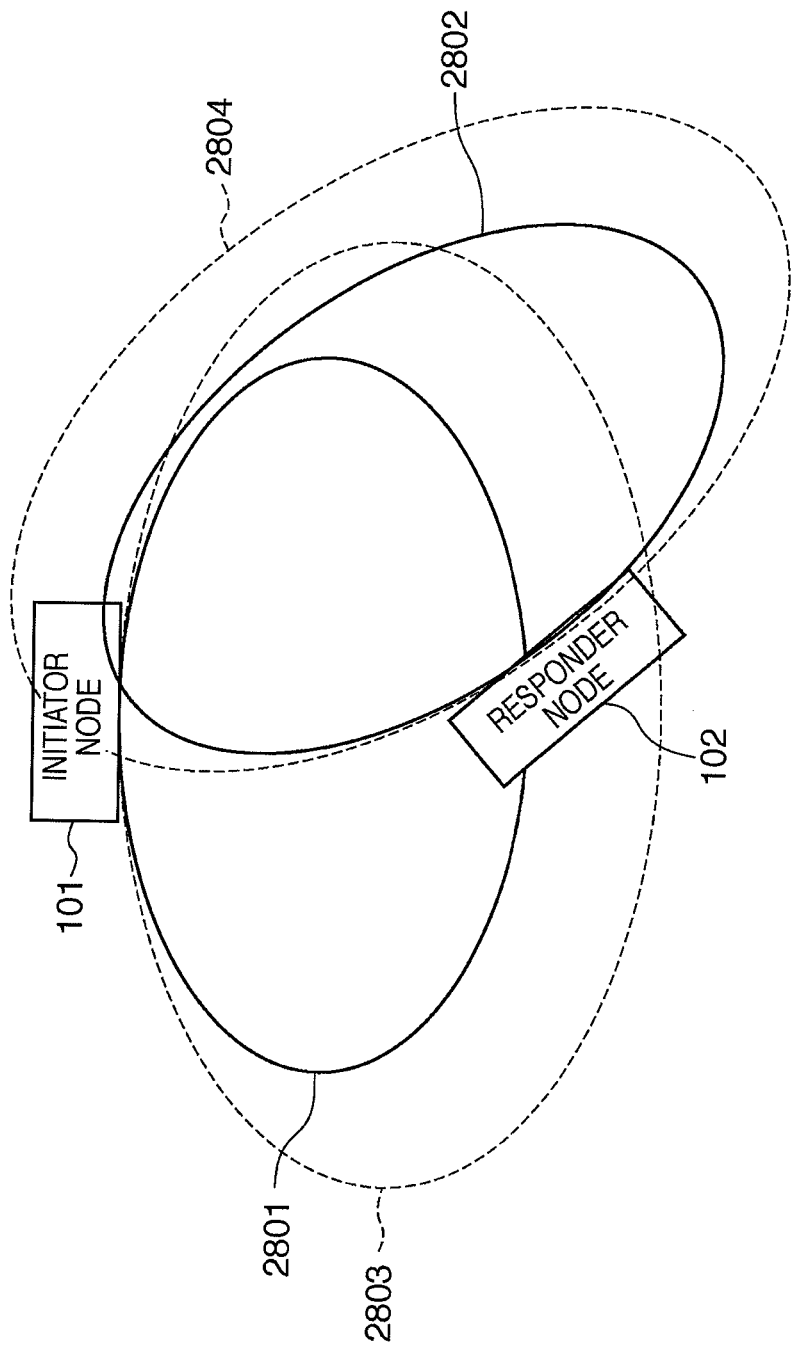
FIG. 28 depicts a transmit coverage area of a transmission node, and a receive coverage area of a reception node, according to a second embodiment.

FIG. 28 depicts the directivity and a communication area of the transmit antenna and the receive antenna when the communication system according to the second embodiment is operating in the sleep mode. The initiator node 101 enters the sleep mode with the transmit antenna set to the wide directivity, and the responder node 102 enters the sleep mode with the receive antenna set to the wide directivity as well. The transmit coverage area of the initiator node 101 is denoted by reference numeral 2801. The receive coverage area of the responder node 102 is denoted by reference numeral 2802. It is possible for the responder node 102 to receive the data from the initiator node 101 even if the responder node 102 should change the direction thereof during sleep, such as is depicted in FIG. 28. As a consequence thereof, it is possible for the responder node 102 to receive the wake-up command that is transmitted thereto when the initiator node 101 attempts to wake up from the sleep mode to the active mode. In addition to the change of the directivity angle of the responder node 102 with regard to the sleep mode according to the first embodiment, such as is depicted in FIG. 6, the communication system according to the second embodiment slows down the communication speed therewith to below the communication speed with regard to the active mode. It is thus possible to enlarge a communication coverage area thereof, and to implement a more stable communication thereby. It is possible to employ the PHY Rate 2202 of the frame format depicted in FIG. 22 to change the communication speed. In FIG. 28, a transmit coverage area when the communication speed of the initiator node 101 is slow is denoted by reference numeral 2803. A receive coverage area when the communication speed of the responder node 102 is slow is denoted by reference numeral 2804. A reason why the transmit coverage area is large when the communication speed is slow is as follows: it is possible to continue the communication even if a communication range is extended, if a signal to noise ratio is maintained. Whereas if it is presumed that a condition applies wherein a transmit signal strength is a given constant value, a signal per a single item of information decreases according to the range, it is possible to augment the signal strength that has thus decreased by extending a transmission time thereof. Extending the transmission time thereof, however, means that the transmission time per the single item of information also increases, and the communication speed slows in a reciprocal relationship therewith.

Figure 29:
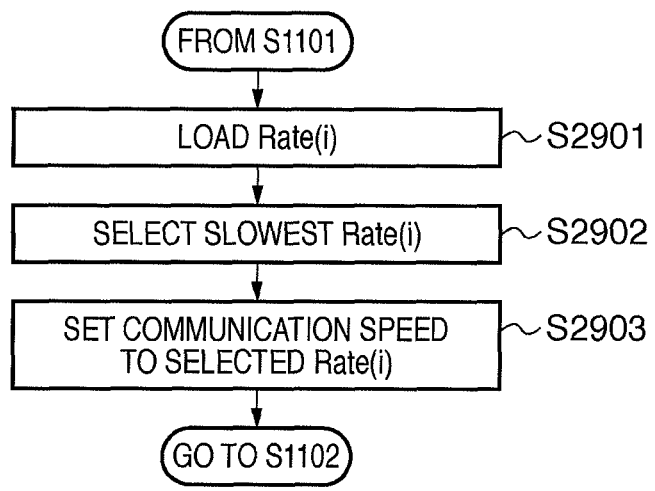
FIG. 29 is a flowchart describing an operation of setting the communication speed when the initiator node is in the sleep mode, according to the second embodiment.

Following is a description of a flow when the initiator node 101 operates at the slow communication speed during the sleep mode, in addition to the sleep mode operation of the initiator node 101 that is depicted in FIG. 11, with reference to FIG. 29. As an instance, the operating flow thereof would be interposed between step S1101 and step S1102.

In step S2901, the initiator node 101 loads the communication speed that is stored in step S1008 from the RAM 120. Thereafter, in step S2902, the initiator node 101 selects a slowest communication speed from the communication speed thus loaded. In step S2903, the initiator node 101 uses the communication speed thus selected in the transmission.

Figure 30:
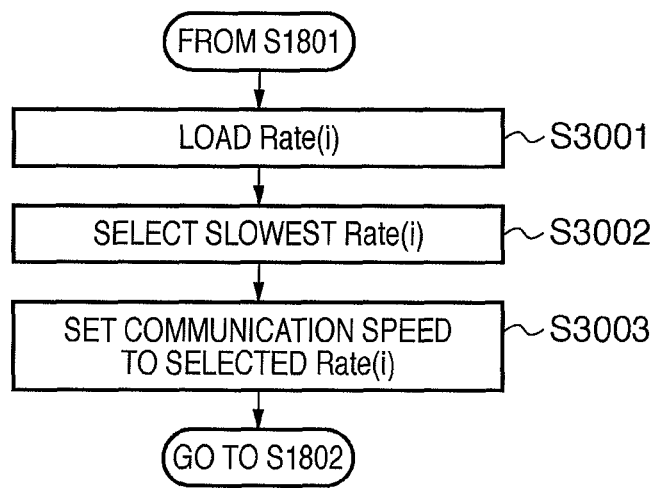
FIG. 30 is a flowchart describing an operation of setting the communication speed when the responder node is in the sleep mode, according to the second embodiment.

Following is a description of a flow when the responder node 102 operates at the slow communication speed during the sleep mode, in addition to the sleep mode operation of the responder node 102 that is depicted in FIG. 18, with reference to FIG. 30. As an instance, the operating flow thereof would be interposed between step S1801 and step S1802.

In step S3001, the responder node 102 loads the communication speed that is stored in step S1705 from the RAM 120. Thereafter, in step S3002, the responder node 102 selects a slowest communication speed from the communication speed thus loaded. In step S3003, the responder node 102 uses the communication speed thus selected in the transmission.

Whereas the slowest communication speed is set during the sleep mode as described herein, it is to be understood that the present invention is not restricted thereto, and a circumstance wherein the communication speed with respect to the sleep mode is set to a slower speed than the communication speed with respect to the active mode.

It is to be understood that, when waking up, in step S704 and step S1404, the communication speed of the initiator node 101 and the responder node 102 is set once more, and the communication speed thereof recovers as a result.

Third Embodiment

A configuration of a communication apparatus and a communication system according to a third embodiment is similar to the configuration of the communication apparatus and the communication system according to the first embodiment. The third embodiment adds a change to the program thereof.

Figure 31:
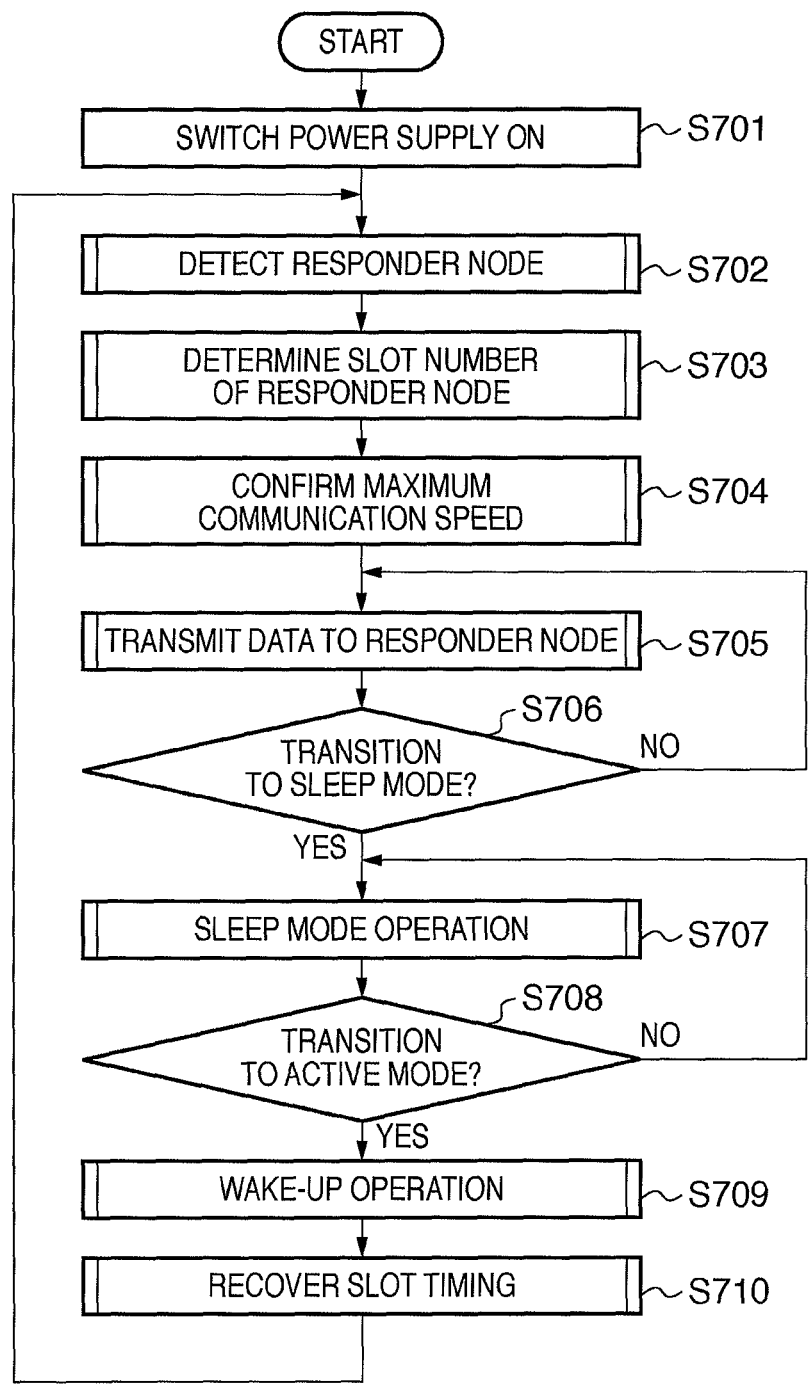
FIG. 31 is a flowchart that depicts the operation of the initiator node according to a third embodiment.

Following is a description of an operation of the initiator node 101 according to the third embodiment, with reference to the flowchart depicted in FIG. 31. Whereas each of step S701 to step S710 is similar to each respective step that is depicted in FIG. 7, step S702 is executed after step S710. Put another way, the search for the responder node is invariably executed after the slot timing is restored, according to the third embodiment.

Figure 32:
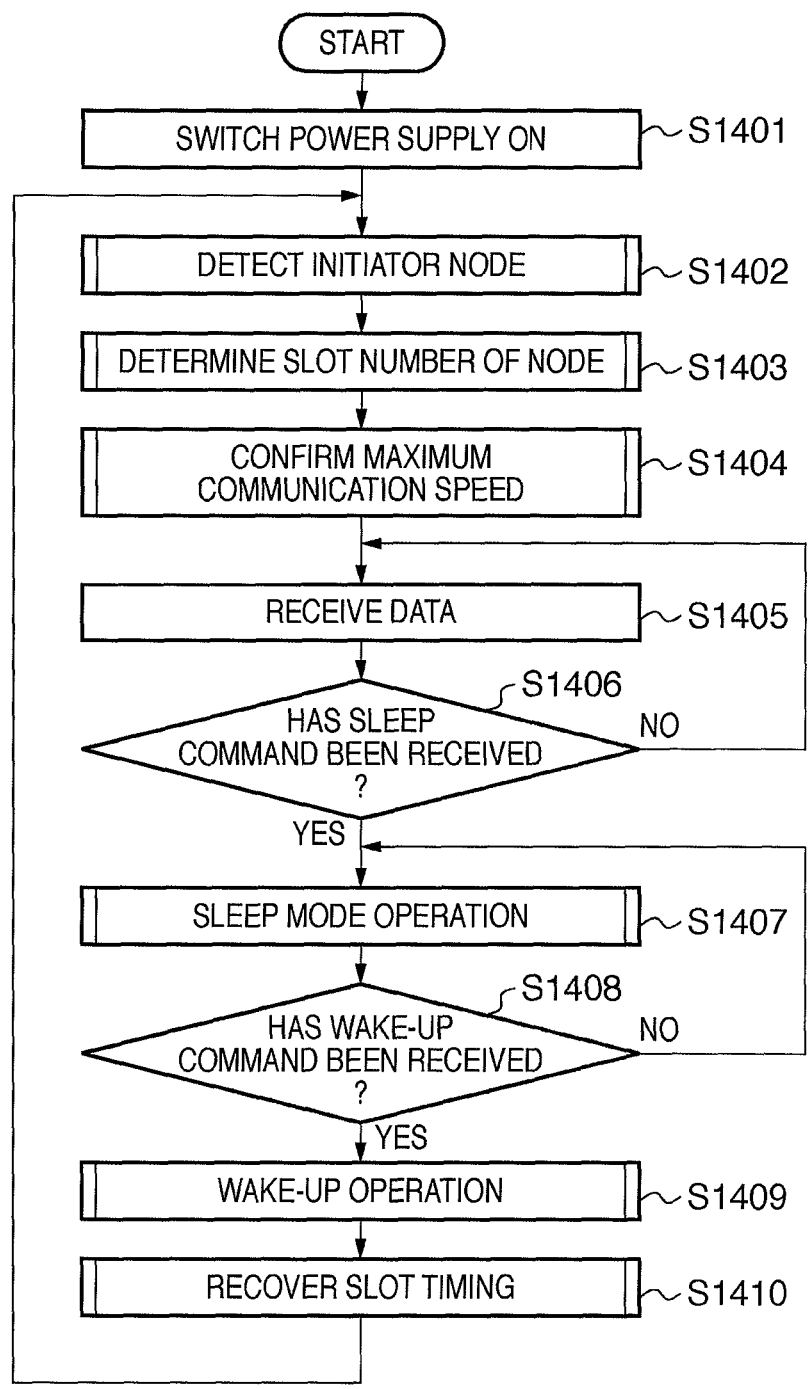
FIG. 32 is a flowchart that depicts the operation of the responder node according to the third embodiment.

Following is a description of an operation of the responder node 102 according to the third embodiment, with reference to the flowchart depicted in FIG. 32. Whereas each of step S1401 to step S1410 is similar to each respective step that is depicted in FIG. 14, step S1402 is executed after step S1410. Put another way, the directivity angle is adjusted by invariably searching for the responder node after the slot timing is restored, according to the third embodiment.

Fourth Embodiment

A configuration of a communication apparatus and a communication system according to a fourth embodiment is similar to the configuration of the communication apparatus and the communication system according to the first embodiment. The fourth embodiment adds a change to the program thereof.

The communication apparatus according to the fourth embodiment does not employ the polling method. Rather, the initiator node 101 activates the responder node 102 at an arbitrary time.

Figure 33:
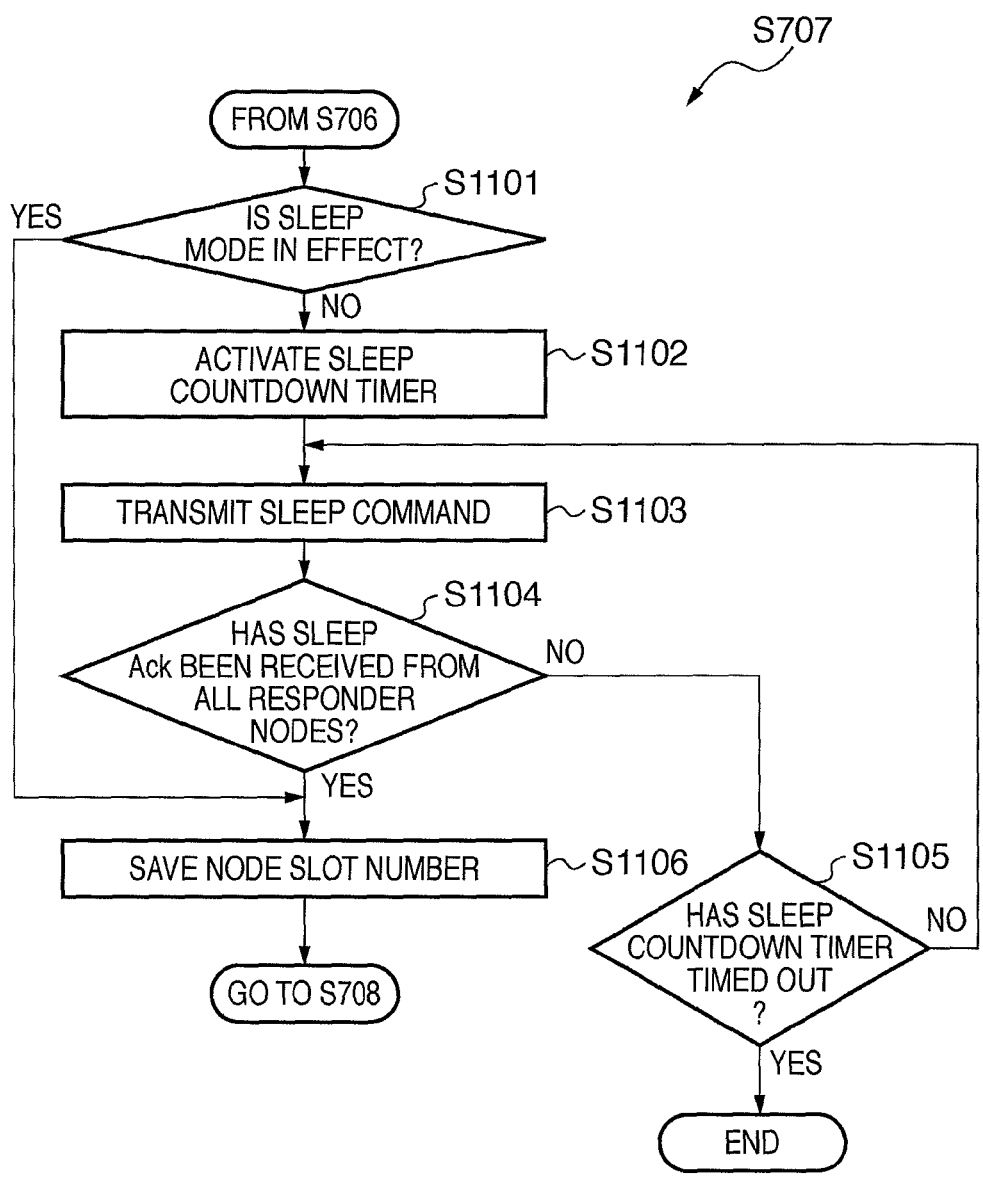
FIG. 33 is a flowchart that depicts the operation when the initiator node is in the sleep mode, according to a fourth embodiment.

Following is a description of the operation of the initiator node 101 with respect to the sleep mode, with reference to FIG. 33. A process that is depicted in FIG. 33 is almost identical to the process that is depicted in FIG. 11, with an exception that the sequence of step S1107 is not present in the process that is depicted in FIG. 33, because the latter process does not perform the polling of the responder node 102 in accordance with a polling rate thereof.

Following is a description of the operation of the responder node 102 with respect to the sleep mode, with reference to FIG. 34. A process that is depicted in FIG. 34 is almost identical to the process that is depicted in FIG. 18, with an exception that the sequence of step S1809 is not present in the process that is depicted in FIG. 34, because the latter process does not receive the polling from the initiator node 101 in accordance with the polling rate thereof.

While the preferred embodiments have been described herein in detail, it would be possible for the present invention to assume an embodiment such as a system, an apparatus, a method, a program, or a storage medium, as an instance. Specifically, it would be permissible to apply the present invention to a system that is configured from a plurality of devices, as well as to apply the present invention to an apparatus that is formed from a single device.

It is to be understood that the present invention includes a circumstance wherein the function according to the embodiment described herein is achieved by supplying a software program to either the system or the apparatus, either directly or remotely, and a computer of either the system or the apparatus loading and executing the program code thus supplied thereto. In such a circumstance, the program thus supplied is a computer program that corresponds to the flowchart that is depicted in the drawing according to the embodiment.

Accordingly, the program code itself that is installed upon the computer in order to implement the function process according to the present invention also implements the present invention. Put another way, the present invention also incorporates the program code itself in order to implement the function process according to the present invention.

In such a circumstance, the program code may have any form that possesses a function of a program, such as an object code, a program that is executed by an interpreter, or a script data that is supplied to an operating system.

Following is an instance of a computer-readable storage medium for supplying the computer program: such as a floppy disk, a hard disk drive, an optical disk, a magneto-optical (MO) disk, a CD-ROM, a CD-R, a CD-RW, a magnetic tape, a nonvolatile memory card, a ROM, or a DVD (DVD-ROM, DVD-R).

It would also be possible to cite, as another method of supplying the program, employing a browser on a client computer to connect to a webpage on the Internet, and downloading the computer program according to the present invention from the webpage to a recording medium such as a hard disk drive. In such a circumstance, it would be permissible for the program thus downloaded to be a file that is compressed, and which includes an automatic install function. In addition, the implementation thereof would also be possible by segmenting the program code that configures the program according to the present invention into a plurality of files, and downloading each respective file from a different webpage. Put another way, a web server that facilitates the downloading to a plurality of users of the program file in order to implement, on the computer, the function process according to the present invention is also included within the present invention.

In addition, an embodiment would also be possible wherein the program according to the present invention is encoded, stored upon a storage medium, such as a CD-ROM, and distributed to the user. In such a circumstance, it would also be possible to allow a user who satisfies a prescribed condition to download a key information from a webpage on the Internet that decrypts the encryption thereof, to use the key information thus downloaded to execute the program thus encrypted, and thereby to install the program upon the computer.

In addition to the function according to the embodiment to be implemented than the computer executing the program thus loaded thereto, it would be permissible for the function according to the embodiment to be implemented instead in a collaboration with the operating system or other software running upon the computer, in accordance with an instruction of the program thereof. In such a circumstance, the operating system or other software performs an actual process thereof, either in whole or in part, and the function according to the embodiment is implemented by the process thereof.

It would further be permissible for the program that is loaded from the recording medium to be written to a memory that is incorporated into a function expansion board that is installed into the computer, or into a function expansion unit that is attached to the computer, and for the function according to the embodiment to be implemented thereby, either in whole or in part. In such a circumstance, after the program is written to the function expansion board or the function expansion unit, a CPU or other hardware that is incorporated into the function expansion board or the function expansion unit performs the actual processing, either in whole or in part, in accordance with the instruction of the program thereof.

According to the present invention, it is possible to receive the wake-up command after transitioning to the sleep mode more reliably than before, and to perform the transition to the active mode more reliably than before as well.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-212334, filed Aug. 16, 2007, which is hereby incorporated by reference herein in its entirety.

The invention claimed is:

1. A wireless communication system, having a wireless communication apparatus for operating in an active mode and a sleep mode, the wireless communication system comprising:
an antenna control unit configured to control a receiving half-value angle for receiving a signal by an antenna and a receiving directivity angle for receiving the signal by the antenna of the wireless communication apparatus;
a mode control unit configured to control a change between the active mode and the sleep mode; and
a memory configured to store a first directivity angle for receiving the signal from another wireless communication apparatus by the antenna in the active mode,
wherein in a case where the wireless communication apparatus is in the sleep mode, the antenna control unit sets the receiving half-value angle in the sleep mode wider than the receiving half-value angle in the active mode, and
wherein the antenna control unit sets the receiving half-value angle in the active mode narrower than the receiving half-value angle in the sleep mode and sets the receiving directivity angle to the first directivity angle stored in the memory, in response to changing from the sleep mode to the active mode, and the antenna control unit searches, if a communication speed with said other wireless communication apparatus with the receiving half-value angle in the active mode and the first directivity angle in the active mode is slower than a predetermined communication speed, the receiving directivity angle for communicating faster than or equal to the predetermined communication speed.

2. A wireless communication apparatus for operating in an active mode and a sleep mode, comprising:
an antenna control unit configured to control a receiving half-value angle for receiving a signal by an antenna and a receiving directivity angle for receiving the signal by the antenna of the wireless communication apparatus;
a mode control unit configured to control a change between the active mode and the sleep mode; and
a memory configured to store a first directivity angle for receiving the signal from another wireless communication apparatus by the antenna in the active mode,
wherein in a case where the wireless communication apparatus is in the sleep mode, the antenna control unit sets the receiving half-value angle in the sleep mode wider than the receiving half-value angle in the active mode, and
wherein the antenna control unit sets the receiving half-value angle in the active mode narrower than the receiving half-value angle in the sleep mode and sets the receiving directivity angle to the first directivity angle stored in the memory, in response to changing from the sleep mode to the active mode, and the antenna control unit searches, if a communication speed with said other wireless communication apparatus with the receiving half-value angle in the active mode and the first directivity angle in the active mode is slower than a predetermined communication speed, the receiving directivity angle for communicating faster than or equal to the predetermined communication speed.

3. The apparatus according to claim 2, further comprising:
a second memory configured to store a timing of a reception with respect to the active mode;
wherein in a case where the operation mode transitions from the sleep mode to the active mode, the mode control unit sets the wireless communication apparatus such that the wireless communication apparatus communicates at the timing that is stored in the second memory.

4. The apparatus according to claim 2, wherein the mode control unit sets a communication speed with respect to the sleep mode to a slower speed than the communication speed with respect to the active mode.

5. The apparatus according to claim 2, wherein the mode control unit changes between the active mode and the sleep mode, according to an instruction of said other wireless communication apparatus.

6. The apparatus according to claim 2, further comprising an operation unit configured to set the receiving directivity angle by a user operation.

7. The apparatus according to claim 6, wherein the antenna control unit makes the user set the receiving directivity angle, in a case where the receiving directivity angle, which can communicate with said other wireless communication apparatus faster than or equal to the predetermined communication speed, cannot be searched.

8. A control method of a wireless communication apparatus for operating in an active mode and a sleep mode, and controlling a receiving half-value angle for receiving a signal by an antenna and a receiving directivity angle for receiving the signal by the antenna for a communication, the control method comprising the steps of:

controlling a change between the active mode and the sleep mode; and storing in a memory a first directivity angle for receiving the signal from another wireless communication apparatus by the antenna in the active mode, in a case where the wireless communication apparatus is in the sleep mode, setting the receiving half-value angle in the sleep mode wider than the receiving half-value angle in the active mode; and in response to changing from the sleep mode to the active mode, setting the receiving half-value angle in the active mode narrower than the receiving half-value angle in the sleep mode and setting the receiving directivity angle to the first directivity angle stored in the memory, then searching, if a communication speed with said other wireless communication apparatus with the receiving half-value angle in the active mode and the first directivity angle in the active mode is slower than a predetermined communication speed, the receiving directivity angle for communicating faster than or equal to the predetermined communication speed.

9. The method according to claim 8, further comprising the steps of:

storing a timing of a reception with respect to the active mode in a second memory; and in a case where the operation mode transitions from the sleep mode to the active mode, setting the wireless communication apparatus such that the wireless communication apparatus communicates at the timing that is stored in the memory.

10. The method according to claim 8, wherein:

the mode control step sets a communication speed with respect to the sleep mode to a slower speed than the communication speed with respect to the active mode.

11. A non-transitory computer-readable storage medium configured to store a computer program configured to cause a computer to execute the method according to claim 8.

* * * * *